(12) United States Patent
Koyama

(10) Patent No.: US 6,771,976 B1
(45) Date of Patent: Aug. 3, 2004

(54) RADIOCOMMUNICATION APPARATUS, RADIOCOMMUNICATION SYSTEM, AND RADIOCOMMUNICATION METHOD

(75) Inventor: Akihiro Koyama, Tokyo (JP)

(73) Assignee: Sony Corporation, Tokyo (JP)

(*) Notice: Subject to any disclaimer, the term of this patent is extended or adjusted under 35 U.S.C. 154(b) by 659 days.

(21) Appl. No.: 09/718,028

(22) Filed: Nov. 20, 2000

(30) Foreign Application Priority Data

Nov. 19, 1999 (JP) ......... P11-330006

(51) Int. Cl.[7] ............... H04J 3/06
(52) U.S. Cl. ............ 455/502; 455/506; 455/507; 370/350; 370/365; 370/479
(58) Field of Search ............. 455/502, 507, 455/506, 343.4; 375/141, 365; 370/479, 350

(56) References Cited

U.S. PATENT DOCUMENTS

| | | | | |
|---|---|---|---|---|
| 4,561,089 A | * | 12/1985 | Rouse et al. | 370/479 |
| 4,790,013 A | * | 12/1988 | Kage | 375/365 |
| 5,596,582 A | * | 1/1997 | Sato et al. | 370/509 |
| 5,619,507 A | * | 4/1997 | Tsuda | 370/350 |
| 6,075,812 A | * | 6/2000 | Cafarella et al. | 375/141 |

* cited by examiner

Primary Examiner—Nay Maung
Assistant Examiner—Alan T. Gantt
(74) Attorney, Agent, or Firm—Jay H. Maioli

(57) ABSTRACT

A radiocommunication apparatus, a radiocommunication system, and a radiocommunication method adapted to a radio network system for attaining synchronism of a reception signal, which contains a plurality of synchronism attainment signals representing the same pattern of bits, relative to a reference signal, in which the autocorrelation function of the reception signal and the cross-correlation function thereof are detected, and the synchronism attainment signals contained in the reception signal are detected based on the detected autocorrelation function and cross-correlation function. Consequently, a receiving side can reliably detect the synchronism attainment signals.

20 Claims, 18 Drawing Sheets

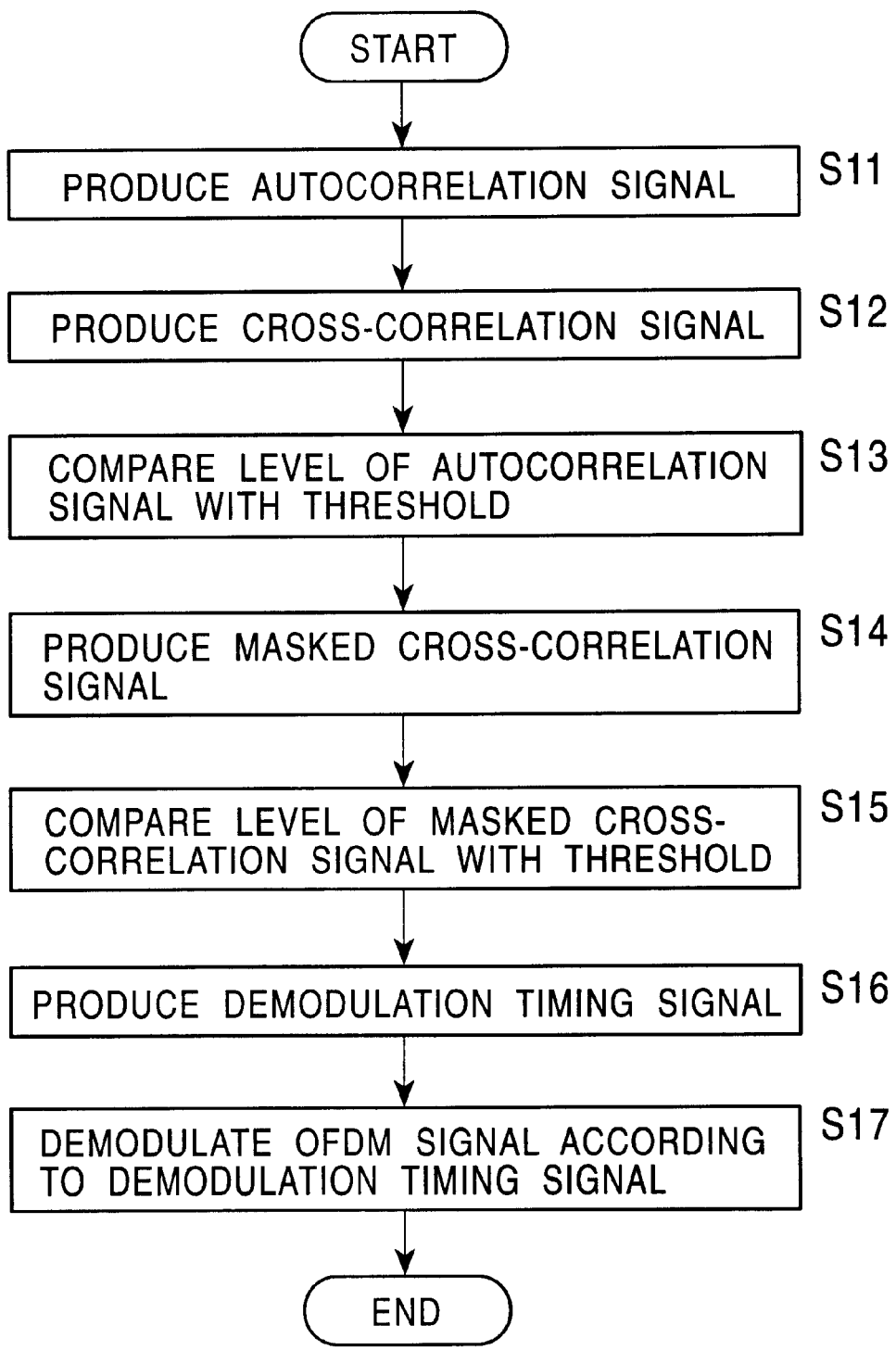

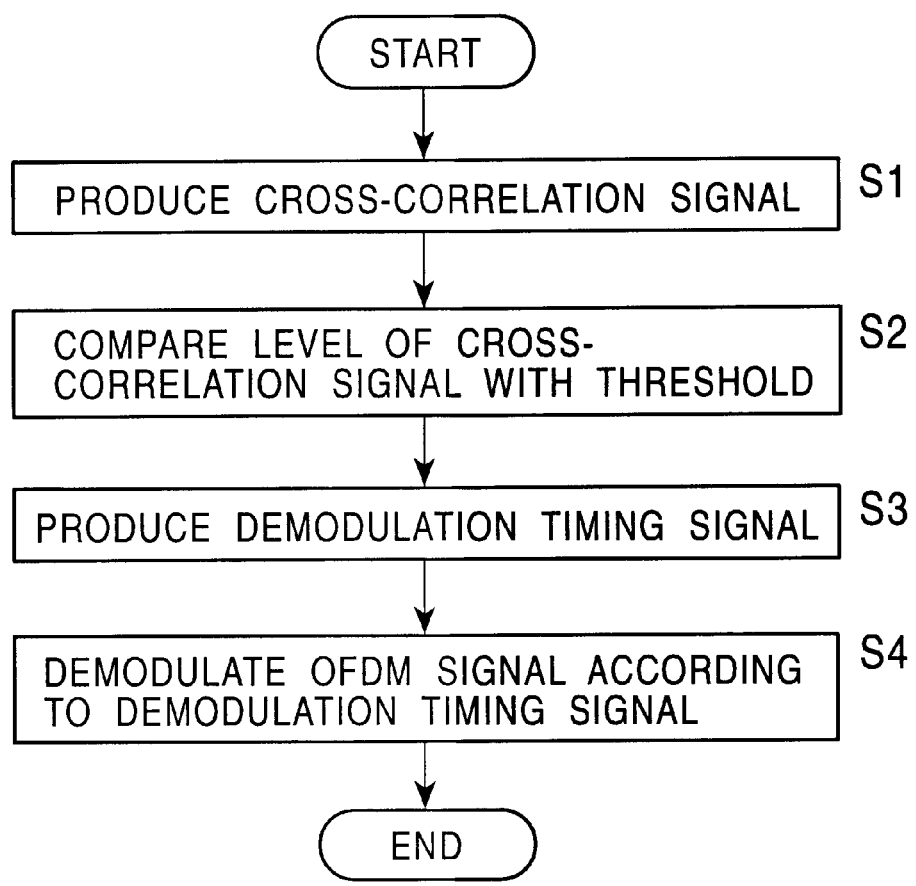

RADIOCOMMUNICATION APPARATUS, RADIOCOMMUNICATION SYSTEM, AND RADIOCOMMUNICATION METHOD

BACKGROUND OF THE INVENTION

1. Field of the Invention

The present invention relates to a radiocommunication apparatus, a radiocommunication system, and a radiocommunication method which are preferably adapted to, for example, a radio network system to be installed on the premises.

2. Description of the Related Art

With the advancement of computers, it has become a boom to interconnect a plurality of computers to construct a local area network (LAN) for the purpose of utilizing files or data in common or transferring electronic mails or data. Existing LANS are constructed with computers interconnected over an optical fiber, a coaxial cable, or a twisted-pair cable.

Such a wire LAN requires construction work for connections and is therefore hard to construct. Moreover, cables employed are rather annoying. A wireless LAN is therefore attracting people's attention as a system relieving a user from cable connection needed to construct the conventional wire LAN.

A wireless LAN over which data is communicated according to the code division multiple access (CDMA) method based on the modulation method of spectrum spreading has been proposed. According to the CDMA method, communication data is multiplied based on a pseudonoise (PN) code and the spectrum of a signal representing the data is thus spread. The data transmitted through spectrum spreading is demodulated while being multiplied based on the same PN code as that used on the transmitting side. The CDMA method is characterized in that it can highly reliably maintain privacy and withstand interference.

In recent years, a multimedia approach to information has made a progress and a large amount of data including image data and voice data has come to be treated. The wireless LAN is requested to offer a high transfer rate so that a large amount of data including image data and voice data can be transferred. However, according to the modulation method of spectrum spreading, when an attempt is made to transfer data at a high transfer rate of, for example, 30 Mbps, a frequency band of 300 MHz and above is needed. Such a wide frequency band cannot be preserved according to an existing standard on frequency assignment. It is impossible to preserve the wide frequency band for communication.

Moreover, according to the spectrum spreading method, synchronism must be attained so that a signal representing a code of transmitted data will be in phase with a signal representing a code generated by a receiver for demodulation. Therefore, according to the spectrum spreading method, a bit stream intended for synchronization is inserted into each packet. This poses a problem that the bit stream for synchronization leads to an increased number of bits other than those serving as effective data.

SUMMARY OF THE INVENTION

The present invention attempts to solve the foregoing problems underlying the related art. An object of the present invention is to provide a radiocommunication apparatus, a radiocommunication system, and a radiocommunication method capable of transmitting a large amount of data including image data and voice data at a high rate, and helpful in decreasing the number of bits other than bits serving as effective data.

Moreover, the present invention attempts to break through the current situation of a background art to be described below. Another object of the present invention is to provide a radiocommunication apparatus, a radiocommunication system, and a radiocommunication method in which a receiving side can reliably detect synchronism attainment signals under a multipath environment, and highly precisely demodulate a signal.

The Inventor has proposed a technique of transmitting payload type data according to the orthogonal frequency division multiplexing (OFDM) method and communicating data in units of a frame according to the time division multiple access (TDMA) method. Herein, a synchronism attainment signal representing a predetermined pattern of bits such as a maximum-length shift-register sequence is transmitted within the leading time interval of one frame. The timing of transferring payload type data is determined with the synchronism attainment signal as a reference. According to the technique, a receiving side detects the synchronism attainment signal using a matched filter or the like, and determines the timing of demodulating the payload type data present within the frame according to the detected timing of the synchronism attainment signal. Consequently, a symbol serving as the data present within the frame and transmitted according to the OFDM is demodulated accurately.

FIG. 18 shows the configuration of a reception circuit 500 serving as the background of the present invention proposed by the Inventor. FIG. 19 is a flowchart describing processing to be performed by the reception circuit 500 shown in FIG. 18. In the reception circuit 500 shown in FIG. 18, a reception signal S501 received by an antenna 501 is converted into a radio-frequency signal by a radio-frequency conversion circuit 502 and digitized by an A/D converter 503. This results in a reception signal S503.

The reception signal S503 is output to a cross-correlation detection circuit 504 and an OFDM modulation circuit 507.

The cross-correlation detection circuit 504 uses, for example, a matched filter to detect the cross-correlation of the reception signal S503 relative to a synchronism attainment signal representing a predetermined pattern of bits that is acquired in advance. Consequently, a cross-correlation signal S504 representing the detected cross-correlation is output to a demodulation timing determination circuit 506 (step S1).

The cross-correlation signal S504 exhibits a pulse abruptly at the timing corresponding to the timing of the synchronism attainment signal contained in the reception signal S503.

The demodulation timing determination circuit 506 compares the level of the cross-correlation signal S504 with a predetermined threshold, and thus detects the timing at which the level of the cross-correlation signal S504 exceeds the threshold (step S2).

The demodulation timing determination circuit 506 produces a demodulation timing signal S506 that exhibits a pulse at the detected timing, and outputs the demodulation timing signal to the OFDM demodulation circuit 507 (step S3).

The OFDM demodulation circuit 507 demodulates a payload type signal at the timing determined with the demodulation timing signal S506 as a reference (step S4).

According to the background art proposed by the Inventor, the level of the cross-correlation signal S504 may not, as shown in FIG. 20B, exceed the threshold at the timing of a sample thereof coincident with the synchronism attainment signal under a multipath environment. Otherwise, the level of the cross-correlation signal S504 may exceed the threshold at the timing of a sample thereof other than the sample coincident with the synchronism attainment signal. Herein, the multipath environment is a condition that radio waves are propagated from a transmitting side within a communication system to a receiving side over a plurality of paths because the radio waves are reflected from structures within a building or on the premises. This poses a problem in that the demodulation timing determination circuit 506 may not be able to accurately produce the demodulation timing signal S506.

FIG. 20A shows an example of the waveform of the cross-correlation signal S504 under a non-multipath environment. FIG. 20B shows an example of the waveform of the cross-correlation signal S504 under the multipath environment. In FIG. 20A and FIG. 20B, the axis of abscissas indicates the timing of a sample, and the axis of ordinates indicates the level of the cross-correlation signal S504.

For overcoming the drawbacks of the aforesaid related art and background art, the present invention provides constituent features and operations described below.

According to the first aspect of the present invention, a radiocommunication apparatus attains the synchronism of a reception signal, which contains a plurality of synchronism attainment signals representing the same pattern of bits, relative to a reference signal. The radiocommunication apparatus consists mainly of an auto-correlation detection circuit, a cross-correlation detection circuit, and a synchronism attainment circuit. The autocorrelation detection circuit detects the autocorrelation function of the reception signal. The cross-correlation detection circuit detects the cross-correlation function of the reception signal. The synchronism attainment circuit detects the synchronism attainment signals contained in the reception signal according to the detected autocorrelation function and cross-correlation function, and attains the synchronism.

Operations to be exerted by the radiocommunication apparatus in accordance with the first aspect of the present invention will be described below.

The autocorrelation detection circuit detects the autocorrelation of the reception signal.

The cross-correlation detection circuit detects the cross-correlation of the reception signal.

The synchronism attainment circuit detects the synchronism attainment signals contained in the reception signal according to the detected autocorrelation function and cross-correlation function, and attains the synchronism according to the detected synchronism attainment signals.

According to the second aspect of the present invention, a radiocommunication apparatus attains the synchronism of a reception signal, which contains a plurality of synchronism attainment signals representing the same pattern of bits, relative to a reference signal. The radiocommunication apparatus consists mainly of an autocorrelation detection circuit, a cross-correlation detection circuit, a mask circuit, and a synchronism attainment circuit. The autocorrelation detection circuit detects the autocorrelation function of the reception circuit. The cross-correlation detection circuit detects the cross-correlation function of the reception signal. The mask circuit masks a predetermined range of the detected cross-correlation function covering the cross-correlation functions of the synchronism attainment signals according to the detected autocorrelation function. The synchronism attainment circuit detects the synchronism attainment signals contained in the reception signal according to the masked cross-correlation function, and thus attains the synchronism.

Operations to be exerted by the radiocommunication apparatus in accordance with the second aspect of the present invention will be described below.

The autocorrelation detection circuit detects the autocorrelation function of the reception signal.

The cross-correlation detection circuit detects the cross-correlation function of the reception signal.

The mask circuit masks the predetermined range of the detected cross-correlation function covering the cross-correlation functions of the synchronism attainment signals according to the detected autocorrelation function.

The synchronism attainment circuit detects the synchronism attainment signals contained in the reception signal according to the masked cross-correlation function, and thus attains the synchronism.

In the radiocommunication apparatus in accordance with the second aspect of the present invention, preferably, the synchronism attainment circuit compares the masked cross-correlation function with a predetermined threshold to detect the synchronism attainment signals.

In the radiocommunication apparatus in accordance with the second aspect of the present invention, preferably, the synchronism attainment circuit specifies a maximum value of the masked cross-correlation function to detect the synchronism attainment signals.

In the radiocommunication apparatus in accordance with the second aspect of the present invention, preferably, the synchronism attainment circuit judges whether the masked cross-correlation function exceeds a predetermined threshold. The synchronism attainment circuit specifies a maximum value from among all the values of the cross-correlation function exceeding the threshold, and thus detects the synchronism attainment signals.

Moreover, in the radiocommunication apparatus in accordance with the second aspect of the present invention, preferably, the synchronism attainment signals are signals representing data encoded according to a pseudo spreading code.

Moreover, in the radiocommunication apparatus in accordance with the second aspect of the present invention, preferably, the synchronism attainment signals are signals transmitted according to the OFDM method.

BRIEF DESCRIPTION OF THE DRAWINGS

FIG. 13 is a flowchart outlining actions to be performed in a radiocommunication apparatus shown in FIG. 2;

FIG. 19 is a flowchart describing actions to be performed by a reception circuit shown in FIG. 18.

DESCRIPTION OF THE PREFERRED EMBODIMENTS

Radiocommunication systems in accordance with embodiments of the present invention will be described below.

First Embodiment

Figure 1:
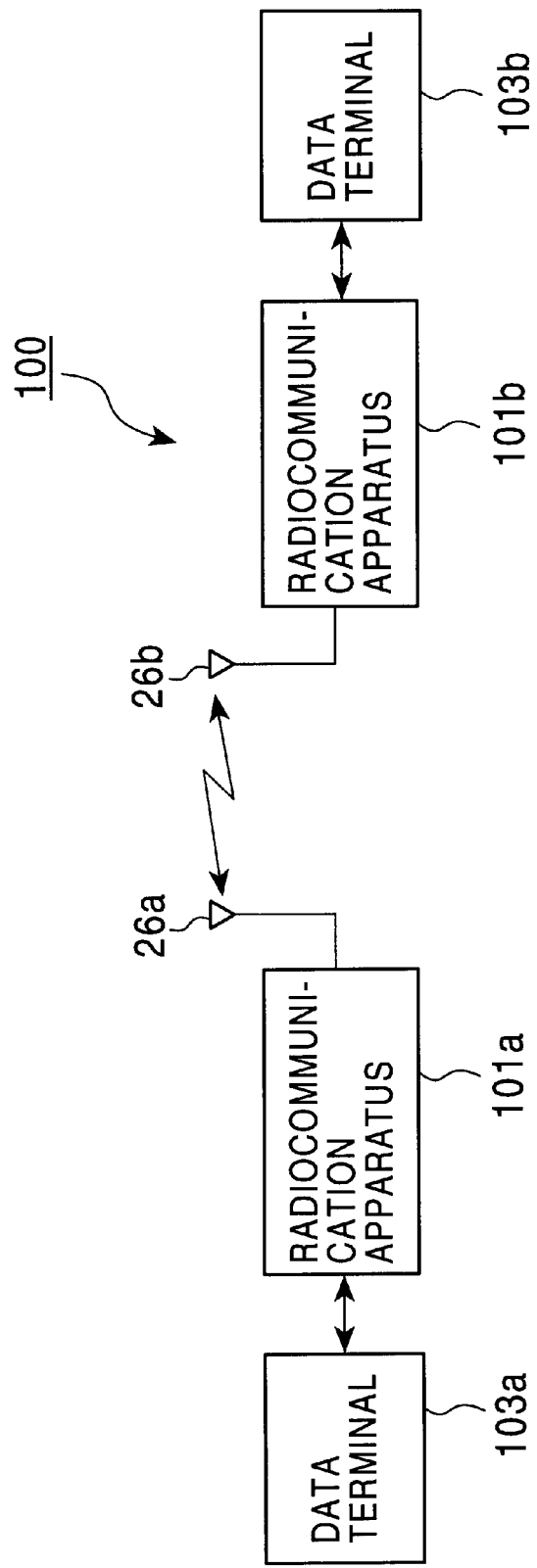
FIG. 1 shows the configuration of a radiocommunication system in accordance with the first embodiment of the present invention.

FIG. 1 shows the configuration of a radiocommunication system 100 in accordance with the present embodiment.

As shown in FIG. 1, in the communication system 100, data communication between data terminals 103a and 103b is achieved through radiocommunication between radiocommunication apparatuses 101a and 101b.

The data terminal 103a and radiocommunication apparatus 101a, and the data terminal 103b and radiocommunication 101b are linked by a cable conformable to the Ethernet or the like.

In the example of FIG. 1, data communication is achieved using two data terminals and two radiocommunication apparatuses. The number of data terminals communicating with one another and the number of radiocommunication apparatuses associated with the data terminals may be set arbitrarily.

Radiocommunication between the radiocommunication apparatuses 101a and 101b is performed based on the orthogonal frequency division multiplexing (OFDM) method. For example, 147455 symbols defined according to the OFDM method (comparable to 4 msec) shall be transmitted within one frame. Data is transmitted in units of a frame while being managed according to the time division multiple access (TDMA) method.

A transmitting side transmits data represented by synchronism attainment signals within the leading time interval of each frame according to the pseudonoise (PN) code that is a kind of spreading code. A receiving side judges the cycle of the frame with the synchronism attainment signals as a reference, and specifies the timing of receiving data present within the frame. The receiving side demodulates the data, which is transmitted according to the OFDM method, with the specified reception timing as a reference.

Figure 2:
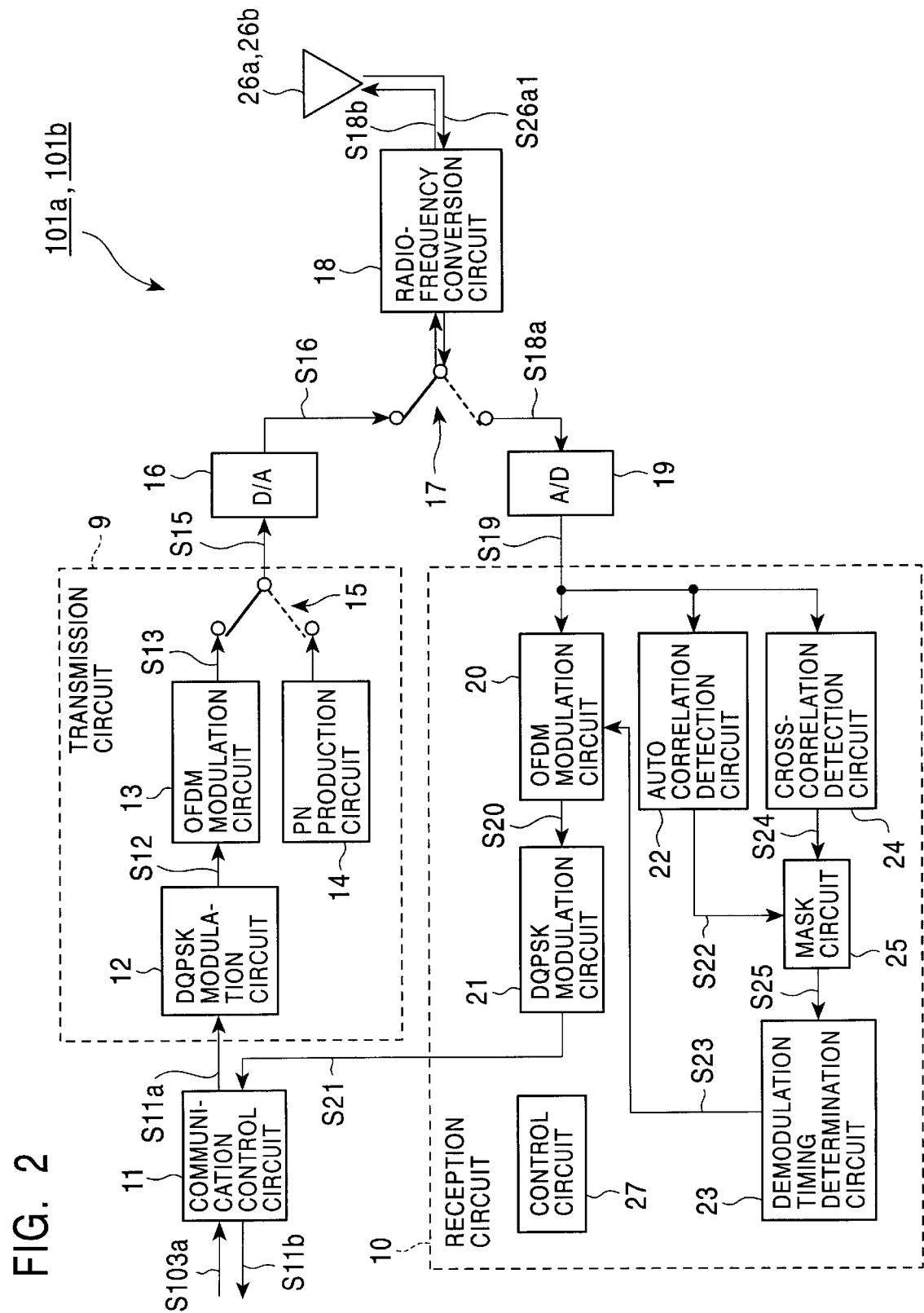
FIG. 2 shows the configuration of a radiocommunication apparatus shown in FIG. 1.

FIG. 2 shows the configuration of the radiocommunication apparatus 101a.

The radiocommunication apparatus 101b shown in FIG. 1 has the same configuration as the radiocommunication apparatus 101a. The description of the radiocommunication apparatus 101b will therefore be omitted.

As shown in FIG. 2, the radiocommunication apparatus 101a consists of, for example, a communication control circuit 11, a differentially encoded quadrature phase shift keying (QPSK) modulation circuit 12, an OFDM modulation circuit 13, a PN production circuit 14, a selection circuit 15, a D/A conversion circuit 16, a selection circuit 17, a radio-frequency conversion circuit 18, an A/D conversion circuit 19, an OFDM demodulation circuit 20, a DQPSK demodulation circuit 21, an autocorrelation detection circuit 22, a demodulation timing determination circuit 23, a cross-correlation detection circuit 24, a mask circuit 25, an antenna 26a, and a control circuit 27.

The DQPSK modulation circuit 12, OFDM modulation circuit 13, and PN production circuit 14 constitute a transmission circuit 9.

The OFDM demodulation circuit 20, DQPSK demodulation circuit 21, autocorrelation detection circuit 22, demodulation timing determination circuit 23, cross-correlation detection circuit 24, and mask circuit 25 constitute a reception circuit 10.

The correspondence between the components shown in FIG. 2 and the constituent features set forth in claims will be described below.

The autocorrelation detection circuit 22 corresponds to the autocorrelation detection circuit in accordance with the present invention. The cross-correlation detection circuit 24 corresponds to the cross-correlation detection circuit in accordance therewith. The mask circuit 25 and demodulation timing determination circuit 23 correspond to the synchronism attainment circuit in accordance therewith. The OFDM demodulation circuit 20 corresponds to the demodulation circuit in accordance therewith.

Moreover, the OFDM modulation circuit 13 and PN production circuit 14 correspond to the signal production circuit in accordance with the present invention. The antenna 26 corresponds to the transmitting means and receiving means in accordance therewith.

(Communication control circuit 11)

The communication control circuit 11 superimposes a signal representing a cyclic redundancy check (CRC) code, which is a code word used to detect an error, to a transmission signal S103a sent from the data terminal 103a shown in FIG. 1. The communication control circuit 11 thus produces a transmission signal S11a and outputs it to the DQPSK modulation circuit 12.

The communication control circuit 11 uses a CRC code represented by a signal contained in a reception signal S21 fed from the DQPSK demodulation circuit 21 to detect and correct an error in the reception signal S21. The communication control circuit 11 thus produces a reception signal S11b and sends it to the data terminal 103a.

(DQPSK modulation circuit 12)

The DQPSK modulation circuit 12 modulates the signal S11a according to the DQPSK method. The DQPSK modulation circuit thus produces a transmission signal S12 and outputs it to the OFDM modulation circuit 13.

(OFDM modulation circuit 13)

Figure 3:
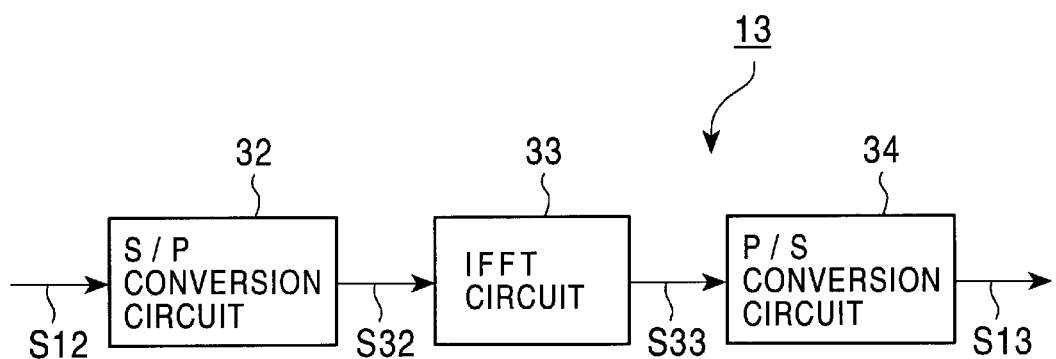
FIG. 3 shows the configuration of an OFDM modulation circuit shown in FIG. 2.

The OFDM modulation circuit 13 consists, as shown in FIG. 3, of a serial-to-parallel (S/P) conversion circuit 32, an inverse fast Fourier transform (IFFT) circuit 33, and a parallel-to-serial (P/S) conversion circuit 34.

The S/P conversion circuit 32 converts the transmission signal S12 transferred through bit serial into a transmission signal S32 to be transferred through bit parallel, and outputs the transmission signal S32 to the IFFT circuit 33.

The IFFT circuit 33 performs inverse fast Fourier transform on the transmission signal S32 to thus map the transmission signal S32, which has been transferred through bit parallel, into a time domain signal. The resultant transmission signal S33 is output to the P/S conversion circuit 34.

The P/S conversion circuit 34 converts the transmission signal S33, which has been mapped to a time domain signal, from bit parallel to bit serial. The P/S conversion circuit 34 then transmits the resultant transmission signal S13 to the selection circuit 15 shown in FIG. 2.

The OFDM modulation circuit 13 uses a plurality of subcarriers produced by propagating carriers orthogonally to one another in units of a spectrum interval f0 so as to prevent intersymbol interference. Signals transmitted at low bit rates are combined with the subcarriers, thus producing a signal to be transmitted at a high bit rate.

Figure 4:
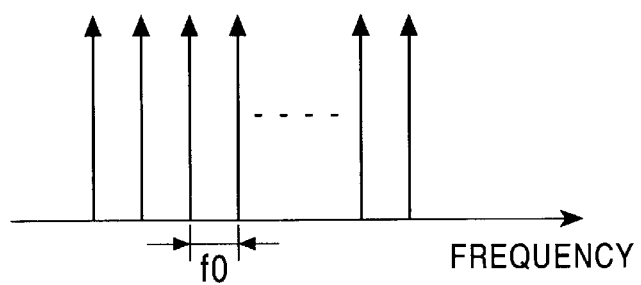
FIG. 4 shows the frequency spectrum of a signal transmitted according to the OFDM method.

FIG. 4 shows the frequency spectrum of a signal transmitted according to the OFDM method.

According to the OFDM method, the transmission signal S12 is converted from bit serial to bit parallel. The resultant signal S32 is subjected to inverse fast Fourier transform, whereby the frequency components of the signal S12 are combined with the mutually orthogonal subcarriers propagated in units of the spectrum interval f0.

For demodulation, the signal components of the subcarriers propagated in units of the spectrum interval f0 are acquired to thus perform fast Fourier transform. Consequently, data items assigned to the subcarriers are acquired.

According to the present embodiment, the S/P conversion circuit 32 acquires 51 samples of different frequencies, which represent intelligence data, from the transmission signal S12 fed from the DQPSK modulation circuit 12, and converts a signal composed of the 51 samples from bit serial to bit parallel. The resultant signal is output to the IFFT circuit 33 through bit parallel.

The IFFT circuit 33 maps the signal composed of the 51 samples output through bit parallel into a time domain signal. The IFFT circuit 33 also maps a signal comparable to 13 samples of the transmission signal S12 and representing invalid data (for example, invalid bits of 0s) into a time domain signal. The IFFF circuit 33 thus produces a signal comparable to 64 samples and representing an effective symbol. Thereafter, a guard interval comparable to 8 samples is added to the signal comparable to 64 samples and representing the effective symbol. The resultant signal is then fed to the P/S conversion circuit 34.

Figure 5:
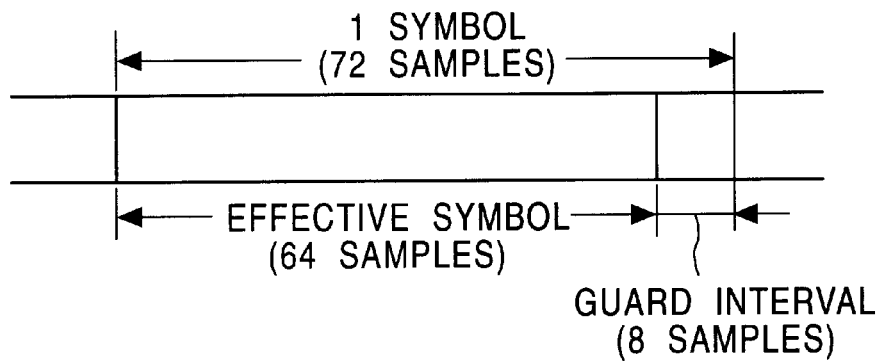
FIG. 5 is an explanatory diagram concerning the structure of one symbol defined in the OFDM method.

As shown in FIG. 5, one symbol is represented by 72 samples resulting from the addition of 64 samples representing the effective symbol and 8 samples comparable to the guard interval. The cycle of a symbol Tsymbol is, for example, 1.953 $\mu$sec, and the cycle of a sample Tsample is, for example, 27.127 nsec. Furthermore, the frequency of the sample fsample is, for example, 36.864 MHz.

According to the OFDM method, a signal representing data is transmitted while having its components distributed into a plurality of subcarriers. The transmission time per symbol is therefore long. However, the guard interval is defined on a time base. Consequently, the OFDM method is characterized in that a signal transmitted according to the OFDM method is unsusceptible to a jitter or multipath distortion. Incidentally, the guard interval is set to approximately one-tenth or two-tenths of the length of the effective symbol.

According to the OFDM method, during demodulation, signal components representing an effective symbol must be extracted from a continuous reception signal and subjected to fast Fourier transform. An error may occur during extraction of the signal components representing the effective symbol because of a jitter or the like. Even in this case, since the guard interval is added, fast Fourier transform results in the same frequency components, though the frequency components may exhibit a phase difference relative to frequency components produced with no error occurring in extracting the signal components representing the effective symbol.

According to the OFDM method, a signal that represents data of a known pattern of bits is inserted into a signal in order to correct the phase of the signal, or a phase difference is canceled using a difference phase demodulation method. Demodulation is thus enabled. When the ordinary quadrature phase shift keying (QPSK) modulation method is adopted, demodulation timing must be adjusted for each bit. In contrast, when the OFDM method is adopted, even if the demodulation timing becomes incorrect, although the sensitivity of a receiving side deteriorates by several dBm, demodulation can be achieved.

Referring back to FIG. 2, a description will be continued.

(PN production circuit 14)

The PN production circuit 14 encodes data according to the maximum-length shift-register sequence (M sequence) code that is a kind of PN code.

The PN production circuit 14 successively outputs two synchronism attainment signals S40a and S40b, which represent the same pattern of bits encoded according to the PN code, to the selection circuit 15. The two synchronism attainment signals S40a and S40b are thus output to the selection circuit 15 in order that the autocorrelation detection circuit 22 included in the reception circuit 10, which will be described later, can detect the timings of the synchronism attainment signals according to the autocorrelation function of the reception signal S19.

Figure 6:
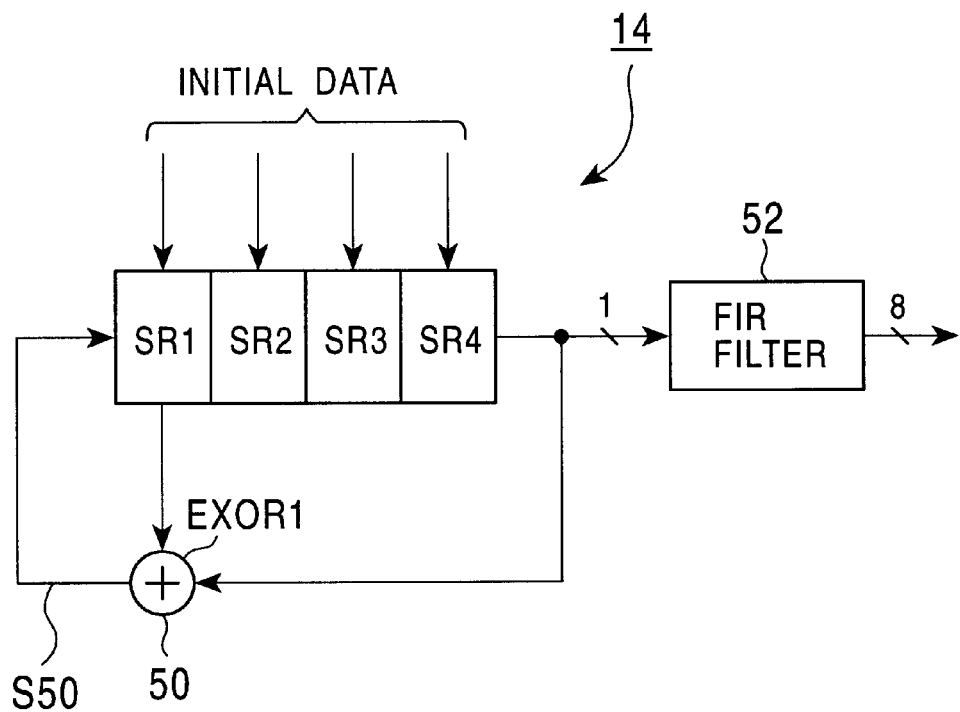
FIG. 6 shows the configuration of a PN production circuit shown in FIG. 2.

FIG. 6 shows the configuration of the PN production circuit 14.

As shown in FIG. 6, the PN production circuit 14 consists of four-stage shift registers $SR_1$ to $SR_4$, an exclusive OR circuit 50, and a far-infrared (FIR) filter 52.

The shift registers $SR_1$ to $SR_4$ each hold, for example, 1111 as initial data, and shift it sequentially from the shift register $SR_1$ to the shift register $SR_4$ responsively to each application of a reference clock having a frequency of, for example, 18.432 MHz.

Binary data output from the shift register $SR_4$ is fed to a finite-duration impulse response (FIR) filter 52 and an exclusive OR circuit 50.

The exclusive OR circuit 50 calculates the exclusive OR of the binary data output from the shift register $SR_4$ and binary data output from the shift register $SR_1$, and outputs the resultant binary data S50 to the shift register $SR_1$.

The FIR filter 52 confines the signal, which represents the code composed of 15 bits output from the shift register $SR_4$, to a predetermined frequency band, and quantizes one pulse of the signal, which represents one bit, into eight levels. Thereafter, the FIR filter 52 outputs a signal representing data encoded according to the PN code and exhibiting 120 levels (15 pulses representing 15 bits by 8) through bit parallel. However, the data represented by the signal output from the FIR filter 52 has the same bit length as the input code, because the eight levels into which one pulse representing each bit of the code is quantized are transferred through bit parallel.

(Selection circuit 15)

Figure 7:
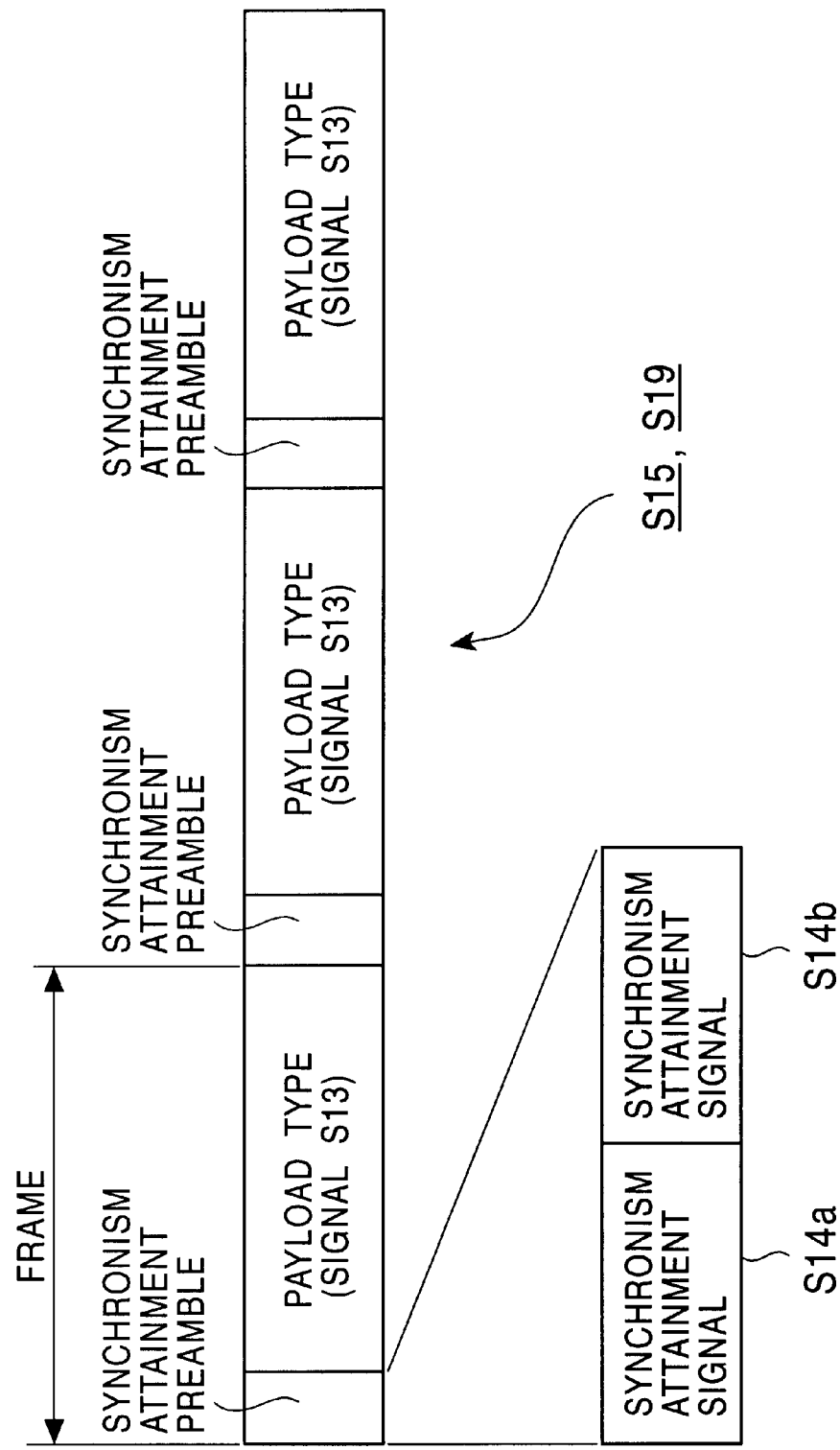
FIG. 7 is an explanatory diagram concerning the structure of a frame in units of which a signal is transmitted or received through radiocommunication according to the first embodiment.

The selection circuit 15 switches the transmission signal S13 output from the OFDM modulation circuit 13 and the synchronism attainment signals S14a and S14b output from the PN production circuit 14 and representing data encoded according to the PN code in response to, for example, a control signal output from the control circuit 27. At this time, the switching is performed so that, as shown in FIG. 7, the synchronism attainment signals S14a and S14b will be successively transferred within each frame and represent a synchronism attainment preamble, and the transmission signal S13 will represent payload types. The selection circuit 15 thus produces the transmission signal S15 and outputs it to the D/A conversion circuit 16.

(D/A conversion circuit 16)

The D/A conversion circuit 16 converts the transmission signal S15 output from the selection circuit 15 from a digital form into an analog form, produces a transmission signal S16, and outputs it to the selection circuit 17.

(Selection circuit 17)

The selection circuit 17 outputs the transmission signal S16 output from the D/A conversion circuit 16 to the radio-frequency conversion circuit 18 according to transmission timing in response to a control signal output from the control circuit 27. The selection circuit 17 outputs a reception signal S18a received from the radio-frequency conversion circuit 18 to the A/D conversion circuit 19 according to reception timing.

(Radio-frequency conversion circuit 18)

The radio-frequency conversion circuit 18 multiplies the transmission signal S16 by a locally oscillatory signal generated by a synthesizer realized with a phase-locked loop (PLL), thus converting the frequency of the transmission signal into a predetermined frequency. Consequently, the radio-frequency conversion circuit 18 produces a signal S18b, amplifies it up to a predetermined power level, and outputs a resultant transmission signal S18b to the antenna 26a.

Moreover, the radio-frequency conversion circuit 18 amplifies a reception signal $26a_1$ received from the antenna 26a up to a predetermined level, and multiplies it by the locally oscillatory signal generated by the PLL synthesizer. The radio-frequency conversion circuit 18 thus produces a reception signal S18a of an intermediate frequency and outputs it to the A/D conversion circuit 19.

(A/D conversion circuit 19)

The A/D conversion circuit 19 digitizes the reception signal S18a output from the radio-frequency conversion circuit 18, and produces a reception signal S19. The A/D conversion circuit 19 then outputs the reception signal S19 to the OFDM modulation circuit 20, autocorrelation detection circuit 22, and cross-correlation detection circuit 24.

(OFDM demodulation circuit 20)

Figure 8:
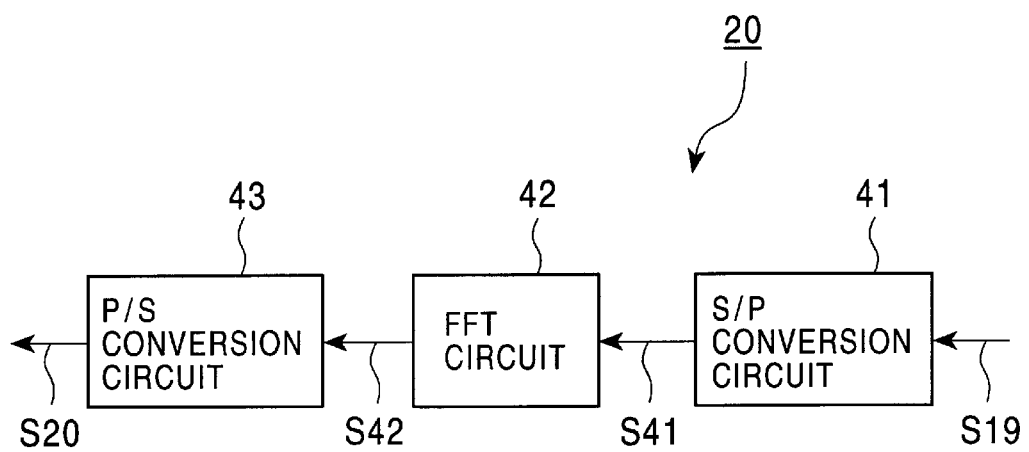
FIG. 8 shows the configuration of an OFDM demodulation circuit shown in FIG. 2.

The OFDM demodulation circuit 20 consists, as shown in FIG. 8, of a serial-to-parallel (S/P) conversion circuit 41, an FFT circuit 42, and a parallel-to-serial (P/S) conversion circuit 43. Based on a demodulation timing signal S23 output from the demodulation timing determination circuit 23, the OFDM modulation circuit 20 demodulates a signal component of the reception signal S19 which represents the payload types shown in FIG. 7 and is transferred through bit serial according to the OFDM method.

The S/P conversion circuit 41 converts the component of the reception signal S19 representing the payload types from bit serial to bit parallel, and outputs the resultant reception signal S41 to the FFT circuit 42.

The FFT circuit 42 performs fast Fourier transform on the reception signal S41, produces a signal S42, and outputs the signal S42 to the P/S conversion circuit 43.

The P/S conversion circuit 43 converts the reception signal S42 back to the reception signal S20 to be transferred through bit serial, and outputs the reception signal S20 to the DQPSK demodulation circuit 21.

In the OFDM modulation circuit 20, the S/P conversion circuit 41 extracts a signal representing effective data, acquires the components of the signal propagated in units of a spectrum interval f0, and thus converts the signal from bit serial to bit parallel. The FFT circuit 42 performs fast Fourier transform. Thus, the OFDM demodulation circuit 20 demodulates a signal transmitted according to the OFDM method.

The DQPSK demodulation circuit 21 demodulates the reception signal S20 modulated according to the DQPSK method, restores a reception signal S21 identical to the signal S11 sent from the transmitting side, and outputs the reception signal S21 to the communication control circuit 11.

Figure 9:
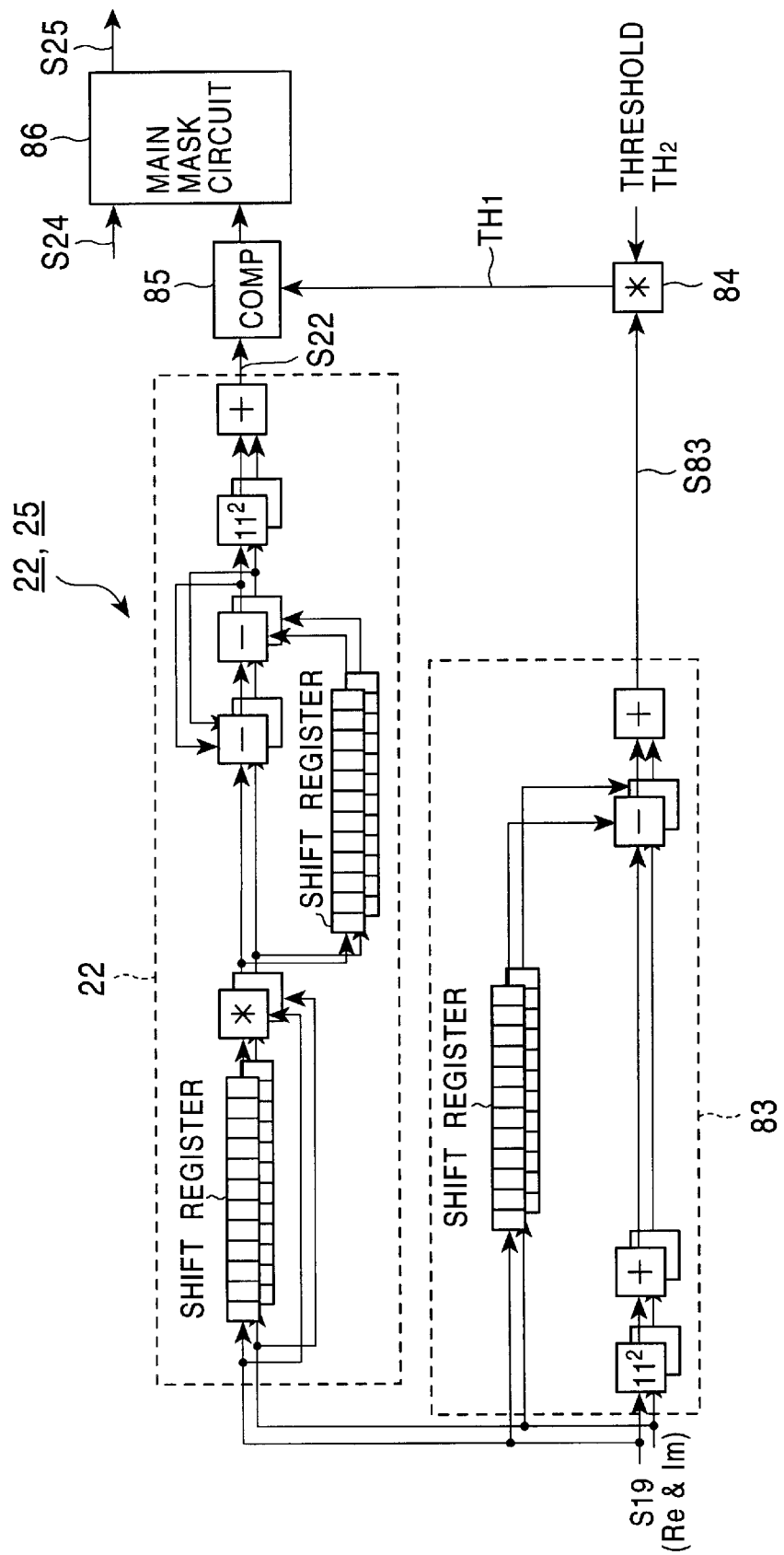
FIG. 9 shows the circuit elements of an autocorrelation detection circuit and a mask circuit shown in FIG. 2.

The autocorrelation detection circuit 22 uses a circuit shown in FIG. 9 to detect the autocorrelation function of the reception signal S19, and outputs an autocorrelation signal S22, which represents the detected autocorrelation function, to the mask circuit 25.

The mask circuit 25 monitors the level of the autocorrelation signal S22. If the mask circuit 25 detects that the level has exceeded a predetermined threshold $TH_1$, the mask circuit 25 outputs a component of a cross-correlation signal S24 as a masked cross-correlation signal S25 to the demodulation timing determination circuit 23. The component of the cross-correlation signal S24 represents the cross-correlation functions of a predetermined number of samples of the reception signal S19 started with a sample acquired since the detection (or samples acquired during a predetermined time since the detection). The mask circuit 25 masks the other component of the cross-correlation signal S24 representing the cross-correlation functions of the other samples of the reception signal.

FIG. 9 shows the circuit elements of the autocorrelation detection circuit 22 and mask circuit 25.

The mask circuit 25 consists of a mean amplitude detection circuit 83, a multiplication circuit 84, a comparison circuit 85, and a main mask circuit 86.

As shown in FIG. 9, components of the reception signal S19 representing a real part Re and imaginary part Im of data and being output from the A/D conversion circuit 19 shown in FIG. 2 are fed to the autocorrelation detection circuit 22 and mean amplitude detection circuit 83 respectively.

The autocorrelation detection circuit 22 detects the autocorrelation function of the reception signal S19. According to the present embodiment, as described in conjunction with FIG. 7, a signal output from the transmitting side contains successively the synchronism attainment signals S14a and S14b that represent the same pattern of bits. The level of the autocorrelation signal S22 increases, as indicated with an arrow A in FIG. 10B, gradually and distinctly at the timings of the synchronism attainment signals S14a and S14b.

Figure 10A:
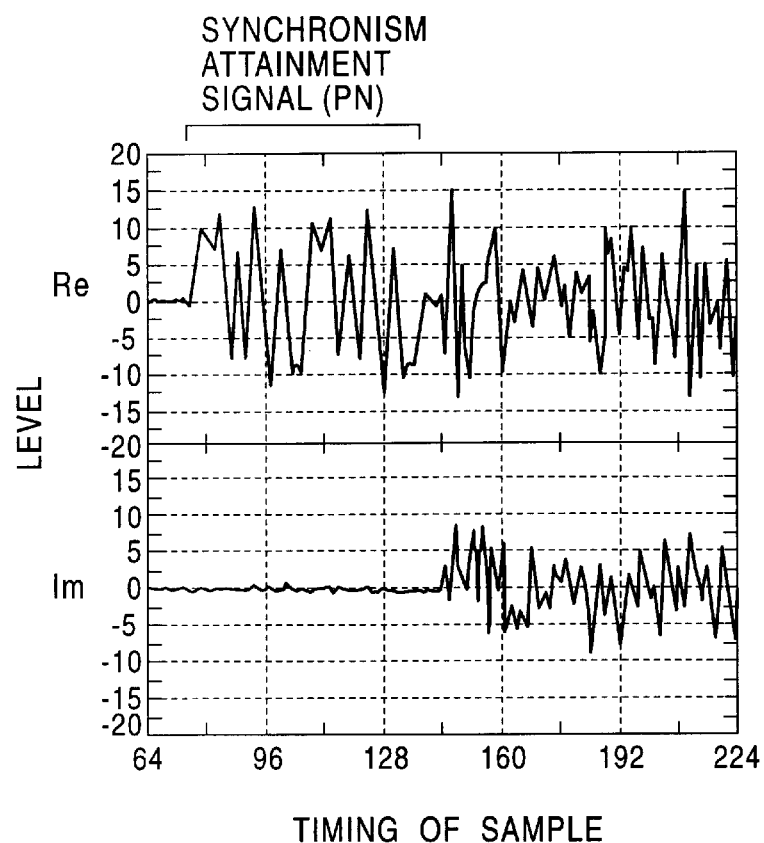
FIG. 10A shows the waveforms of the components of a reception signal S19 representing a real part Re and an imaginary part Im respectively.
Figure 10B:
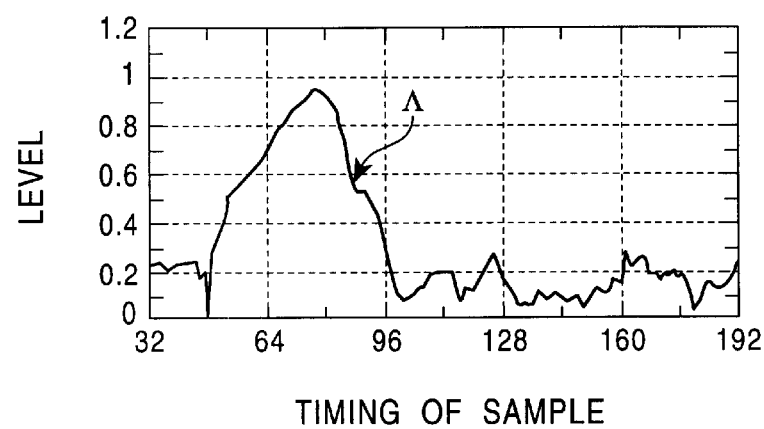
FIG. 10B shows the waveform of an autocorrelation signal S22.

FIG. 10B shows the waveform of the autocorrelation signal S22. FIG. 10A shows the waveforms of the components of the reception signal S19 representing the real part Re and imaginary part Im. In FIG. 10A and FIG. 10B, the axis of abscissas indicates the timing of a sample, and the axis of ordinates indicates a signal level.

The mean amplitude detection circuit 83 detects a mean amplitude exhibited by the reception signal S19, and outputs a signal S83, which represents the mean amplitude, to the multiplication circuit 84.

The multiplication circuit 84 multiplies the signal S83 by a predetermined threshold $TH_2$ to produce a threshold $TH_1$, and outputs the threshold $TH_1$ to the comparison circuit 85.

The comparison circuit 85 compares the level of the autocorrelation signal S22 output from the autocorrelation detection circuit 22 with the threshold $TH_1$. The comparison circuit 85 produces a signal S85 that when the level of the autocorrelation signal S22 exceeds the threshold $TH_1$, represents logical 1. When the level of the autocorrelation signal S22 does not exceed the threshold $TH_1$, the signal S85 represents logical 0. The signal S85 is output to the main mask circuit 86.

When the comparison signal S85 represents logical 1, the main mask circuit 86 outputs the cross-correlation signal S24 as the masked cross-correlation signal S25 to the demodulation timing determination circuit 23. Otherwise, the main mask circuit 86 brings the masked cross-correlation signal S25 to a zero level.

The cross-correlation detection circuit 24 detects the cross-correlation function of the reception signal S19, and outputs the cross-correlation signal S24, which represents the detected cross-correlation function, to the mask circuit 25.

Figure 11:
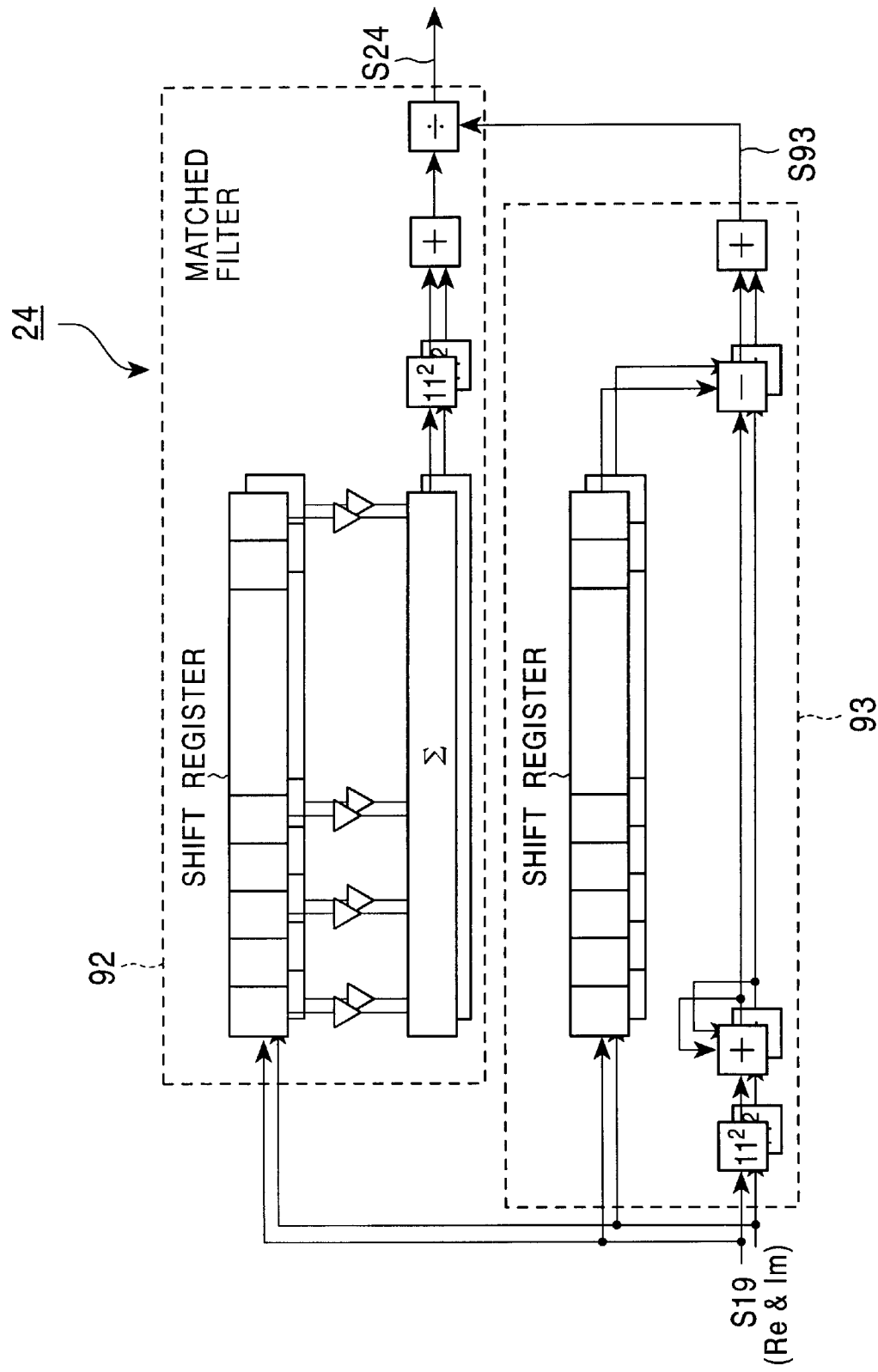
FIG. 11 shows the circuit elements of an autocorrelation detection circuit shown in FIG. 2.

FIG. 11 shows the circuit elements of the cross-correlation detection circuit 24.

As shown in FIG. 11, the cross-correlation detection circuit 24 has a matched filter 92 and a mean amplitude detection circuit 93.

The matched filter 92 detects the cross-correlation functions of the reception signal S19 relative to the synchronism attainment signals S14a and S14b representing a pattern of bits stored in advance. The matched filter 92 divides the cross-correlation functions by the mean amplitude S93 output from the mean amplitude detection circuit 93, produces the cross-correlation signal S24, and outputs the cross-correlation signal S24 to the mask circuit 25 shown in FIG. 2.

Figure 12A:
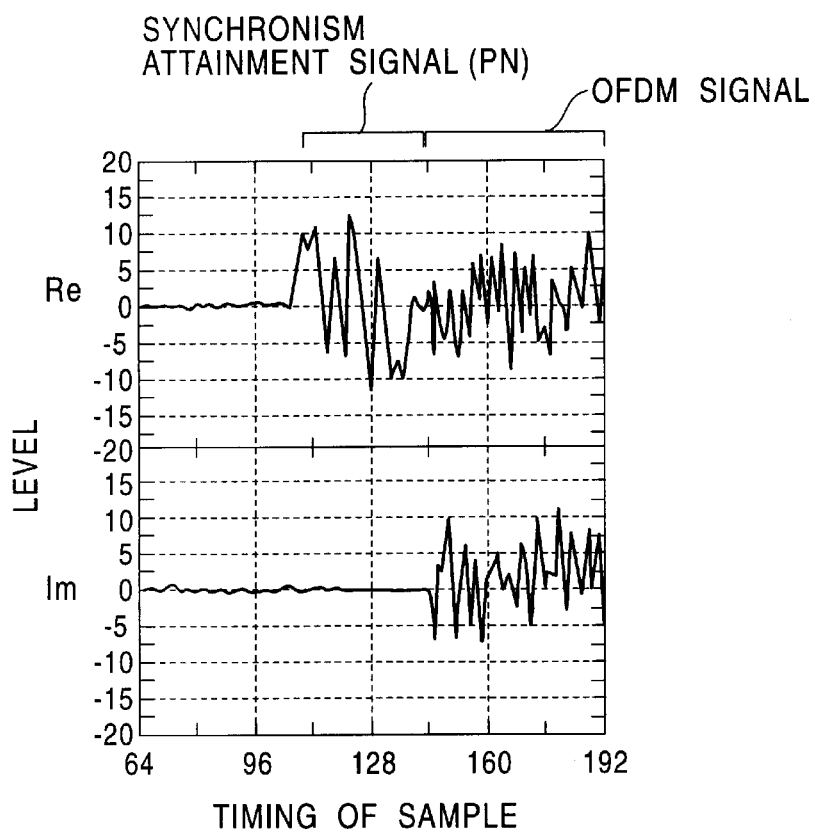
FIG. 12A shows the waveforms of the components of a reception signal S19 representing a real part and an imaginary part respectively.
Figure 12B:
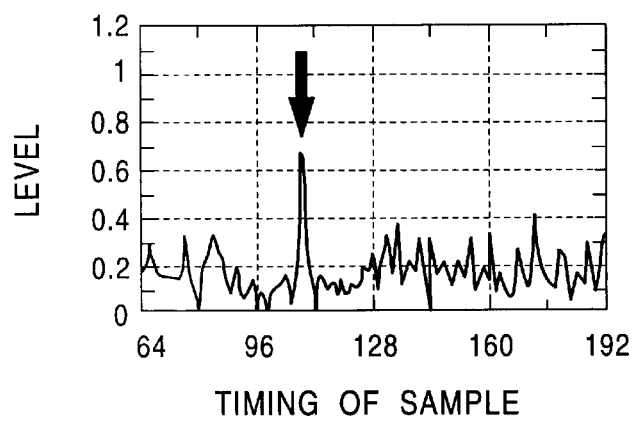
FIG. 12B shows the waveform of a cross-correlation signal S24, wherein the axis of abscissas indicates the timing of a sample.

FIG. 12B shows the waveform of the cross-correlation signal S24, and FIG. 12A shows the waveforms of the components of the reception signal S19 representing the real part and imaginary part respectively. In FIG. 12A and FIG. 12B, the axis of abscissas indicates the timing of a sample and the axis of ordinates indicates a signal level.

The demodulation timing determination circuit 23 compares the level of the masked cross-correlation signal S25 with a threshold $TH_3$, and produces a demodulation timing signal S23 that when the level of the masked cross-correlation signal S25 exceeds the threshold $TH_3$, exhibits a pulse. The demodulation timing determination circuit 23 then outputs the demodulation timing signal S23 to the OFDM demodulation circuit 20.

At this time, the masked cross-correlation signal S25 is, as mentioned above, a cross-correlation signal whose masked component represents the cross-correlation functions of the samples of the reception signal that do not include the synchronism attainment signals S14a and S14b and that are acquired based on the level of the autocorrelation signal S22. Even if the cross-correlation signal S24 contains a noise under a multipath environment or the like, the demodulation timing signal can be produced highly precisely compared with when the cross-correlation signal S24 is compared directly with the threshold in order to produce the demodulation timing signal.

Actions to be performed in the radiocommunication apparatus 101a shown in FIG. 2 will be described below.

(Actions for transmission)

A signal S103a output from the data terminal 103a shown in FIG. 1 is sent to the communication control circuit 11 included in the radiocommunication apparatus 101a shown in FIG. 2.

Thereafter, the communication control circuit 11 superimposes a signal representing a CRC code word for detecting an error on the transmission signal S103a to produce a transmission signal S11a, and outputs the transmission signal S11a to the DQPSK modulation circuit 12.

The DQPSK modulation circuit modulates the transmission signal S11a according to the DQPSK method to produce a signal S12, and outputs the transmission signal S12 to the OFDM modulation circuit 13.

The OFDM modulation circuit 13 modulates the transmission signal S12 in conformity with the OFDM method to produce a transmission signal S13, and outputs the transmission signal S13 to the selection circuit 15.

The PN production circuit 14 produces the two synchronism attainment signals S40a and S40b representing the same pattern of bits arranged according to the PN code, and outputs the signals successively to the selection circuit 15.

The selection circuit 15 switches the transmission signal S13 output from the OFDM modulation circuit 13 and the synchronism attainment signals S40a and S40b output from the PN production circuit 14 according to predetermined timing. The selection circuit 15 produces a transmission signal S15 shown in FIG. 7 and outputs the transmission signal S15 to the D/A conversion circuit 16.

Thereafter, the D/A conversion circuit 16 converts the transmission signal S15 from a digital form into an analog form to produce an analog signal S16. The signal S16 is selected by the selection circuit 17 and output to the radio-frequency conversion circuit 18.

The radio-frequency conversion circuit 18 converts the frequency of the transmission signal S16 into a radio frequency to produce a transmission signal S18b. The transmission signal S18b is output to the antenna 26b of the radiocommunication apparatus 101b shown in FIG. 1 through the antenna 26a.

(Actions for reception)

FIG. 13 is a flowchart outlining actions to be performed in the radiocommunication apparatus 101a shown in FIG. 2.

A reception signal $S26a_1$, output from the antenna 26b of the radiocommunication apparatus 101b shown in FIG. 1 is received by the antenna 26a of the radiocommunication apparatus 101a shown in FIG. 2, and fed to the radio-frequency conversion circuit 18.

The radio-frequency conversion circuit 18 converts the frequency of the reception signal S26a, to a radio frequency to produce a signal S18a. The reception signal S18a is selected by the selection circuit 17 and fed to the A/D conversion circuit 19.

Thereafter, the A/D conversion circuit 19 digitizes the reception signal S18*a* to produce a digital reception signal S19. The reception signal S19 is fed to the OFDM demodulation circuit 20, autocorrelation detection circuit 22, and cross-correlation detection circuit 24.

The autocorrelation detection circuit 22 detects the autocorrelation function of the reception signal S19, and outputs an autocorrelation signal S22, which represents the detected autocorrelation function, to the mask circuit 25 (step S11).

The cross-correlation detection circuit 24 detects the cross-correlation function of the reception signal S19, and outputs a cross-correlation signal S24, which represents the detected cross-correlation function, to the mask circuit 25 (step S12).

The mask circuit 25 monitors the level of the autocorrelation signal S22. When it is detected that the level has exceeded a predetermined threshold $TH_1$ (step S13), a component of the cross-correlation signal S24 representing the cross-correlation functions of a predetermined number of samples of the reception signal S19 acquired since the detection (or samples acquired during a predetermined time since the detection) is output as a masked cross-correlation signal S25 to the demodulation timing determination circuit 23. The other component of the cross-correlation signal S24 representing the cross-correlation functions of the other samples of the reception signal S19 is masked (step S14).

Thereafter, the demodulation timing determination circuit 23 compares the level of the masked cross-correlation signal S25 with a threshold $TH_2$ (step S15). The demodulation timing determination circuit 23 then produces a demodulation timing signal S23 that when the level of the masked cross-correlation signal S25 has exceeded the threshold $TH_2$, exhibits, for example, a pulse. The demodulation timing signal S23 is then output to the OFDM demodulation circuit 20 (step S16).

The OFDM demodulation circuit 20 demodulates components of the reception signal S19 transmitted through bit serial according to the OFDM method, which represent the payload types shown in FIG. 7, according to the demodulation timing signal S23 output from the demodulation timing determination circuit 27 (step S17).

As mentioned above, in the radiocommunication system 100, the transmitting side successively transmits the synchronism attainment signals S14*a* and S14*b* within each frame. The receiving side uses the autocorrelation detection circuit 22, demodulation timing determination circuit 23, cross-correlation detection circuit 24, and mask circuit 25 to produce the high-precision modulation timing signal S23. Even under a multipath environment, the OFDM demodulation circuit 20 can highly precisely demodulate a signal transmitted according to the OFDM method.

Moreover, in the radiocommunication system 100, since a signal is transmitted according to the OFDM method and then demodulated, a large amount of data including image data and voice data can be transmitted at a high rate.

Furthermore, in the radiocommunication system 100, since the synchronism attainment signals are transmitted within each frame, the number of bits can be decreased because bits other than those of effective data can be eliminated.

Second Embodiment

A radiocommunication system in accordance with the second embodiment is identical to the radiocommunication system 100 in accordance with the first embodiment except the ability of the demodulation timing determination circuit 23 included in the reception circuit 10 shown in FIG. 2.

The demodulation timing determination circuit 23 employed in the present embodiment monitors the level of the masked cross-correlation signal S25 output from the mask circuit 25, and detects the timings of samples of the masked cross-correlation signal S25 at which the level of the masked cross-correlation signal S25 becomes maximum. The demodulation timing determination circuit 23 produces the demodulation timing signal S23 that exhibits a pulse at the same timings as the detected timings of the samples, and outputs it to the OFDM demodulation circuit 20.

Actions to be performed for reception in the radiocommunication system in accordance with the present embodiment will be described below.

Figure 14:
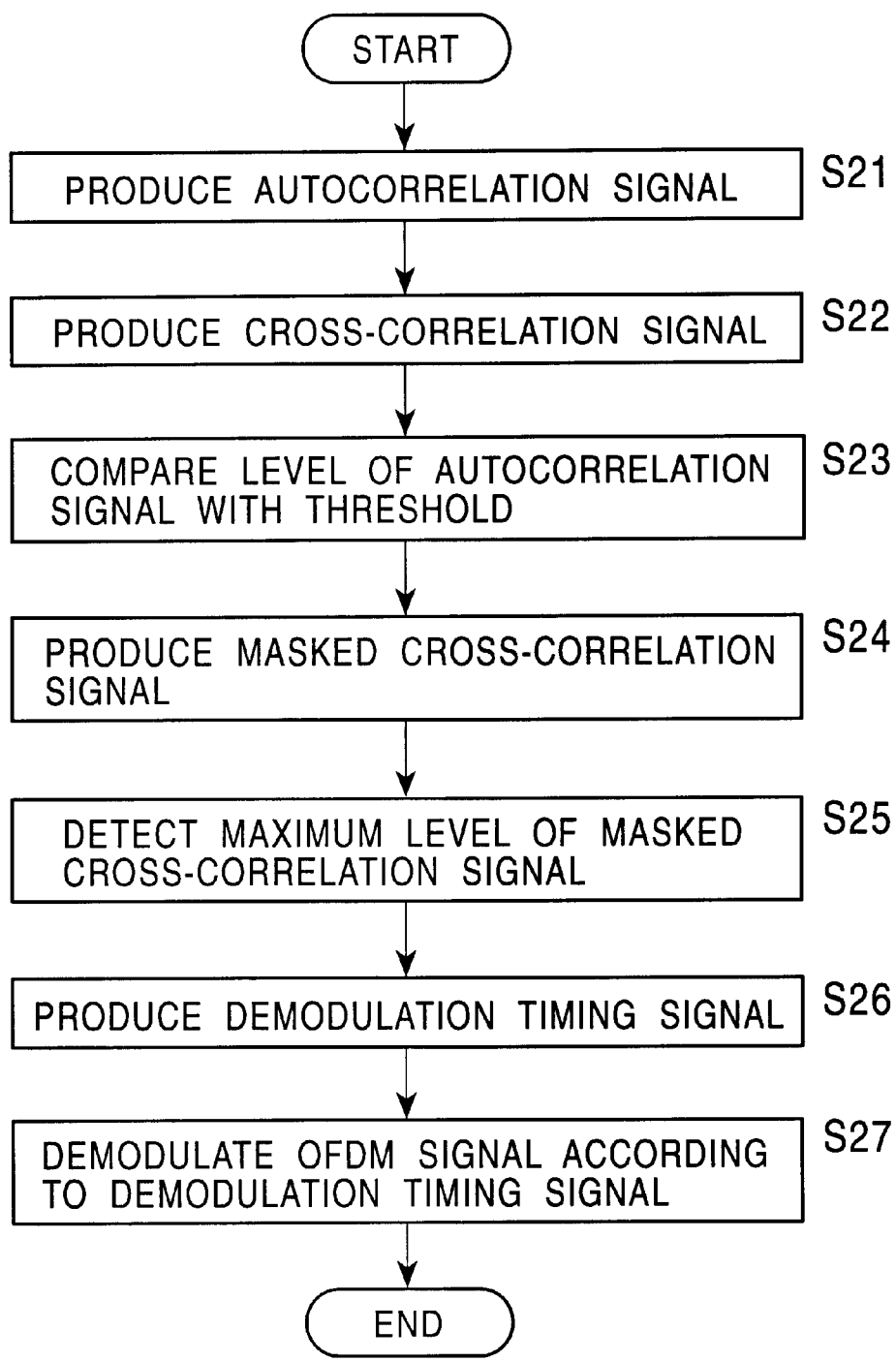
FIG. 14 is a flowchart outlining actions to be performed for reception in a radiocommunication system in accordance with the second embodiment of the present invention.

FIG. 14 is a flowchart outlining the actions to be performed for reception in the radiocommunication system in accordance with the present embodiment.

A reception signal S26$a_1$ sent from the antenna 26*b* of the radiocommunication apparatus 101*b* shown in FIG. 1 is received by the antenna 26*a* of the radiocommunication apparatus 101*a* shown in FIG. 2, and fed to the radio-frequency conversion circuit 18.

The radio-frequency conversion circuit 18 converts the frequency of the reception signal S26$a_1$ into a radio frequency to produce a reception signal S18*a*. The reception signal S18*a* is selected by the selection circuit 17 and fed to the A/D conversion circuit 19.

The A/D conversion circuit 19 digitizes the reception signal S18*a* to produce a digital reception signal S19. The reception signal S19 is fed to the OFDM demodulation circuit 20, autocorrelation detection circuit 22, and cross-correlation detection circuit 24.

The autocorrelation detection circuit 22 detects the autocorrelation function of the reception signal S19, and outputs an autocorrelation signal S22, which represents the detected autocorrelation function, to the mask circuit 25 (step S21).

The cross-correlation detection circuit 24 detects the cross-correlation function of the reception signal S19, and outputs a cross-correlation signal S24, which represents the detected cross-correlation function, to the mask circuit 25 (step S22).

The mask circuit 25 monitors the level of the autocorrelation signal S22. When it is detected that the level has exceeded a predetermined threshold $TH_1$ (step S23), one component of the cross-correlation signal S24 representing the cross-correlation functions of a predetermined number of samples of the reception signal S19 acquired since the detection (or samples acquired during a predetermined time since the detection) is fed as the masked cross-correlation signal S25 to the demodulation timing determination circuit 23. The other component of the cross-correlation signal S24 representing the cross-correlation functions of the other samples thereof is masked (step S24).

The demodulation timing determination circuit 23 monitors the level of the masked cross-correlation signal S25 output from the mask circuit 25, and detects the timings of samples of the masked cross-correlation signal S25 at which the level of the masked cross-correlation signal S25 becomes maximum (step S25). The demodulation timing signal S23 that exhibits a pulse at the same timings as the detected timings of the samples is then produced and fed to the OFDM demodulation circuit 20 (step S26).

The OFDM demodulation circuit 20 demodulates components of the reception signal S19 transmitted through bit serial according to the OFDM method, which represent the payload types shown in FIG. 7, according to the demodulation timing signal S23 output from the demodulation timing determination circuit 27 (step S27).

Even the radiocommunication system in accordance with the present embodiment provides the same advantages as the aforesaid radiocommunication system 100.

Third Embodiment

A radiocommunication system in accordance with the third embodiment is identical to the radiocommunication system 100 in accordance with the first embodiment except the ability of the demodulation timing determination circuit 23 included in the reception circuit 10 shown in FIG. 2.

The demodulation timing determination circuit 23 employed in the present embodiment compares the level of a masked cross-correlation signal S25 with a threshold $TH_3$. The demodulation timing determination circuit 23 then detects the timings of the samples of the masked cross-correlation signal S25, which exhibit a maximum level, from among all the samples of the masked cross-correlation signal S25 whose levels exceed the threshold $TH_3$. The demodulation timing determination circuit 23 then produces a demodulation timing signal S23 that exhibits a pulse at the same timings as the detected timings of the samples, and outputs it to the OFDM demodulation circuit 20.

Actions to be performed for reception in the radiocommunication system in accordance with the present embodiment will be described below.

Figure 15:
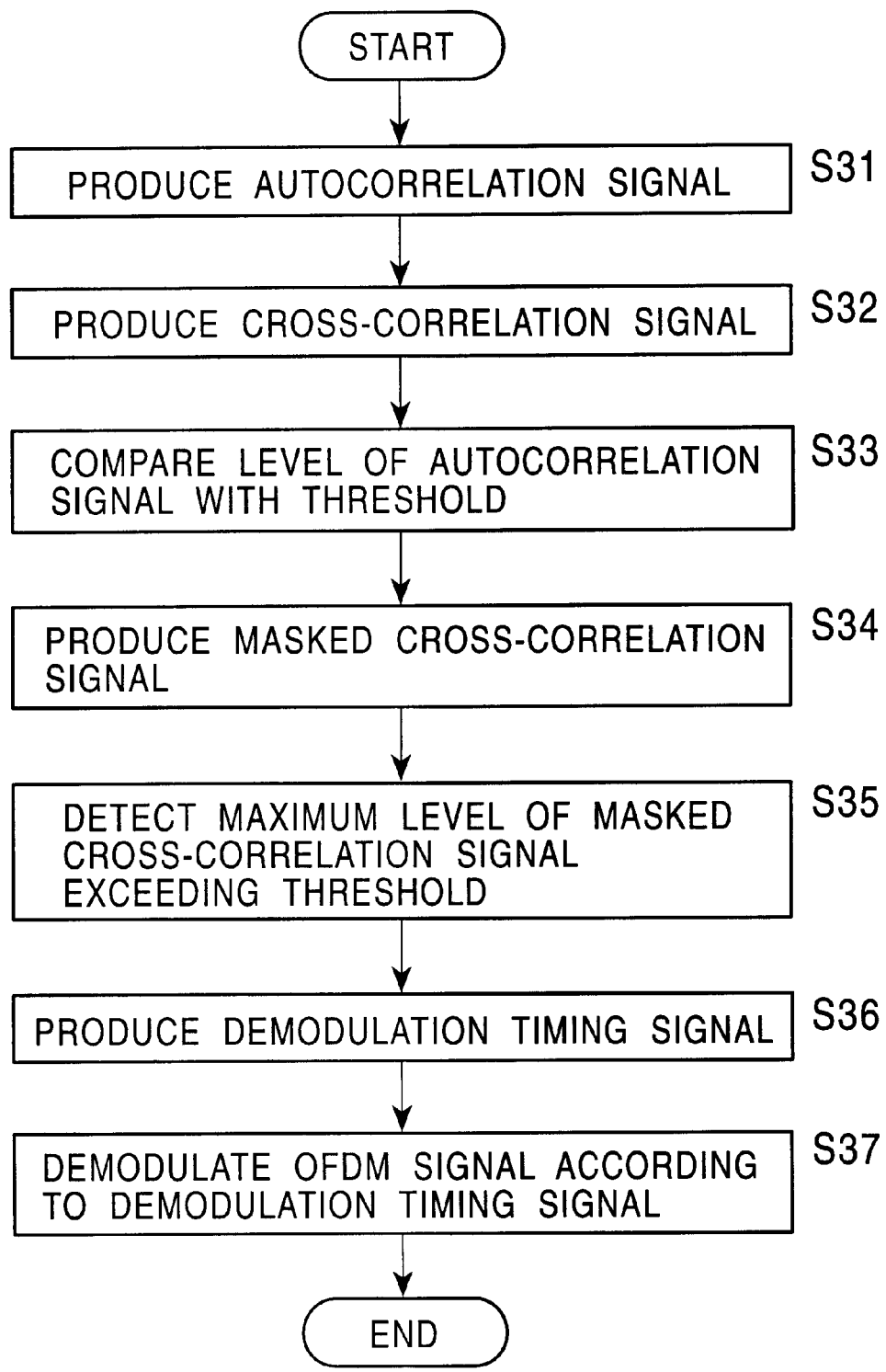
FIG. 15 is a flowchart outlining actions to be performed for reception in a radiocommunication system in accordance with the third embodiment of the present invention.

FIG. 15 is a flowchart outlining the actions to be performed for reception in the radiocommunication system in accordance with the present embodiment.

A reception signal $S26a_1$ sent from the antenna 26b of the radiocommunication apparatus 101b shown in FIG. 1 is received by the antenna 26a of the radiocommunication apparatus 101a shown in FIG. 2, and fed to the radio-frequency conversion circuit 18.

The radio-frequency conversion circuit 18 converts the frequency of the reception signal $S26a_1$ into a radio frequency to produce a signal S18a. The reception signal S18a is selected by the selection circuit 17 and fed to the A/D conversion circuit 19.

The A/D conversion circuit 19 digitizes the reception signal S18a to produce a digital reception signal S19. The reception signal S19 is fed to the OFDM demodulation circuit 20, autocorrelation detection circuit 22, and cross-correlation detection circuit 24.

The autocorrelation detection circuit 22 detects the autocorrelation function of the reception signal S19. An autocorrelation signal S22 representing the detected autocorrelation function is fed to the mask circuit 25 (step S31).

The cross-correlation detection circuit 24 detects the cross-correlation function of the reception signal S19. A cross-correlation signal S24 representing the detected cross-correlation function is fed to the mask circuit 25 (step S32).

The mask circuit 25 monitors the level of the autocorrelation signal S22. If it is detected that the level has exceeded a predetermined threshold $TH_1$ (step S33), one component of the cross-correlation signal S24 representing the cross-correlation functions of a predetermined number of samples of the reception signal S19 acquired since the detection (or samples acquired during a predetermined time since the detection) is fed as a masked cross-correlation signal S25 to the demodulation timing determination circuit 23. The other component of the cross-correlation signal S24 representing the cross-correlation functions of the other samples of the reception signal is masked (step S34).

The demodulation timing determination circuit 23 compares the level of the masked cross-correlation signal S25 with the threshold $TH_3$, and detects the timings of the samples of the masked cross-correlation signal S25, which exhibit a maximum level, from among all the samples thereof whose levels exceed the threshold $TH_3$ (step S35). The demodulation timing signal S23 that exhibits a pulse at the same timings as the detected timings of the samples is then produced and fed to the OFDM demodulation circuit 20 (step S36).

The OFDM demodulation circuit 20 demodulates components of the reception signal S19 transmitted through bit serial according to the OFDM method, which represent the payload types shown in FIG. 7, according to the demodulation timing signal S23 output from the demodulation timing determination circuit 27 (step S37).

In the radiocommunication system of the present embodiment, the level of the masked cross-correlation signal S25 is compared with the threshold $TH_3$. Moreover, the timings of the samples of the masked cross-correlation signal S25, which exhibit a maximum level are detected from among all the samples whose levels exceed the threshold $TH_3$. The demodulation timing signal S23 can therefore be produced highly precisely on a stable basis. Consequently, the OFDM demodulation circuit 20 can demodulate a signal, which has been transmitted according to the OFDM method, highly precisely on a stable basis.

Fourth Embodiment

Figure 16:
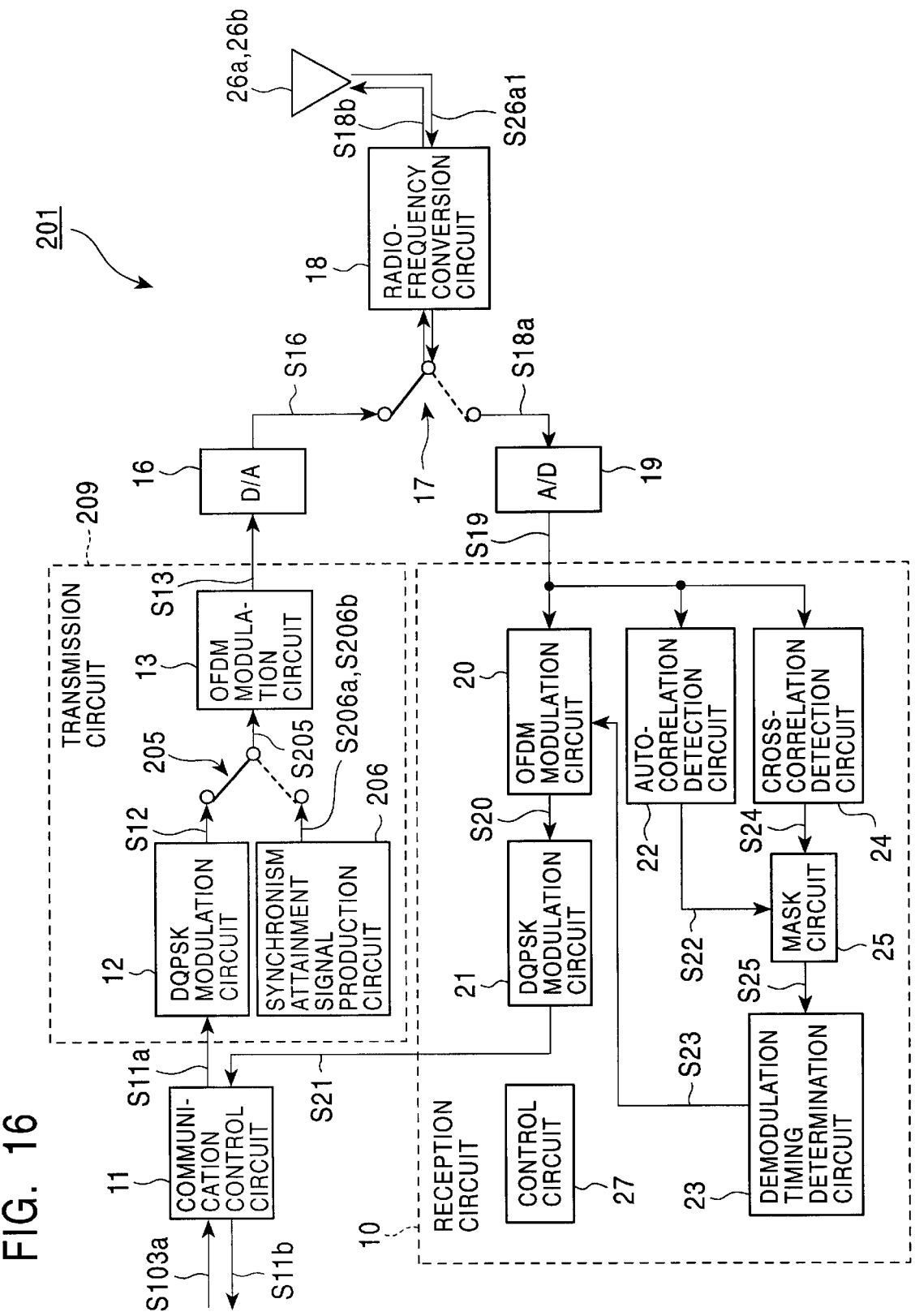
FIG. 16 shows the configuration of a radiocommunication apparatus accommodated by a radiocommunication system in accordance with the fourth embodiment of the present invention.

FIG. 16 shows the configuration of a radiocommunication apparatus 201 accommodated by a radiocommunication system in accordance with the fourth embodiment.

In FIG. 16, components bearing the same reference numerals as those shown in FIG. 2 are identical to the components described in relation to the first embodiment.

The radiocommunication apparatus 201 employed in the present embodiment includes a transmission circuit 209 that is different from the transmission circuit 9 shown in FIG. 2.

As shown in FIG. 16, the transmission circuit 209 consists of the DQPSK modulation circuit 12, a synchronism attainment signal production circuit 206, a selection circuit 205, and the OFDM modulation circuit 13.

The DQPSK modulation circuit 12 and OFDM modulation circuit 13 are identical to those described in relation to the first embodiment.

The transmission circuit 209 is characterized in that synchronism attainment signals are mixed in a transmission signal in a stage preceding the OFDM modulation circuit 13.

Actions to be performed by the transmission circuit 209 will be described below.

A transmission signal S103a sent from the data terminal 103a shown in FIG. 1 is fed to the communication control circuit 11 in the radiocommunication apparatus 201 shown in FIG. 16.

The communication control circuit 11 superimposes a signal, which represents a CRC code word for detecting an error, on the transmission signal S101a to produce a transmission signal S11a. The transmission signal S11a is fed to the DQPSK modulation circuit 12.

The DQPSK modulation circuit 12 modulates the transmission signal S11a according to the DQPSK method to produce a transmission signal S12. The transmission signal S12 is fed to the selection circuit 205.

The synchronism attainment signal production circuit 206 produces synchronism attainment signals S206a and S206b representing the same pattern of bits so that the autocorrelation functions and cross-correlation functions of the signals will meet predetermined requirements even after the signals are modulated in conformity with the OFDM method. The synchronism attainment signals S206a and S206b are fed successively to the selection circuit 205.

The selection circuit 205 selects the transmission signal S12 and the synchronism attainment signals S206a and S206b so that the synchronism attainment signals S206a and S206b will be transmitted within the leading time interval of each frame in units of which the transmission signal S12 is transmitted. A transmission signal S205 is thus produced and fed to the OFDM modulation circuit 13.

The OFDM modulation circuit 13 modulates the transmission signal S205 in conformity with the OFDM method so as to produce a transmission signal S13. The transmission signal S13 is fed to the D/A conversion circuit 16.

The D/A conversion circuit 16 converts the transmission signal S13 from a digital form into an analog form to produce an analog signal S16. The transmission signal S16 is selected by the selection circuit 17 and fed to the radio-frequency conversion circuit 18.

The radio-frequency conversion circuit 18 converts the frequency of the transmission signal S16 into a radio frequency to produce a transmission signal S18b. The transmission signal S18b is transmitted to the antenna 26b of the radiocommunication apparatus 101b shown in FIG. 1 through the antenna 26a.

Even the radiocommunication system in accordance with the present embodiment provides the same advantages as the radiocommunication system 100 in accordance with the first embodiment.

Fifth Embodiment

Figure 17:
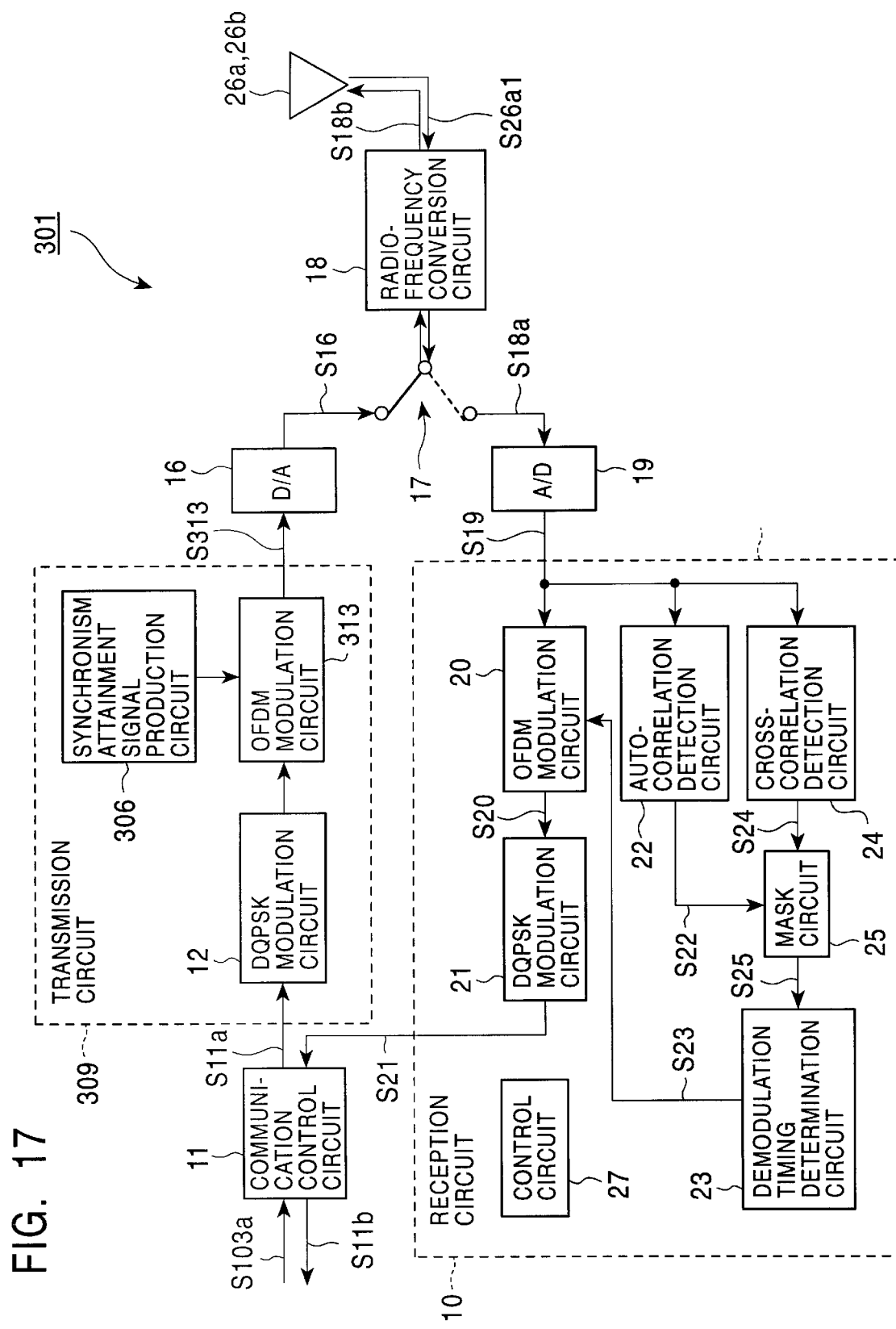
FIG. 17 shows the configuration of a radiocommunication apparatus accommodated by a radiocommunication system in accordance with the fifth embodiment of the present invention.
Figure 18:
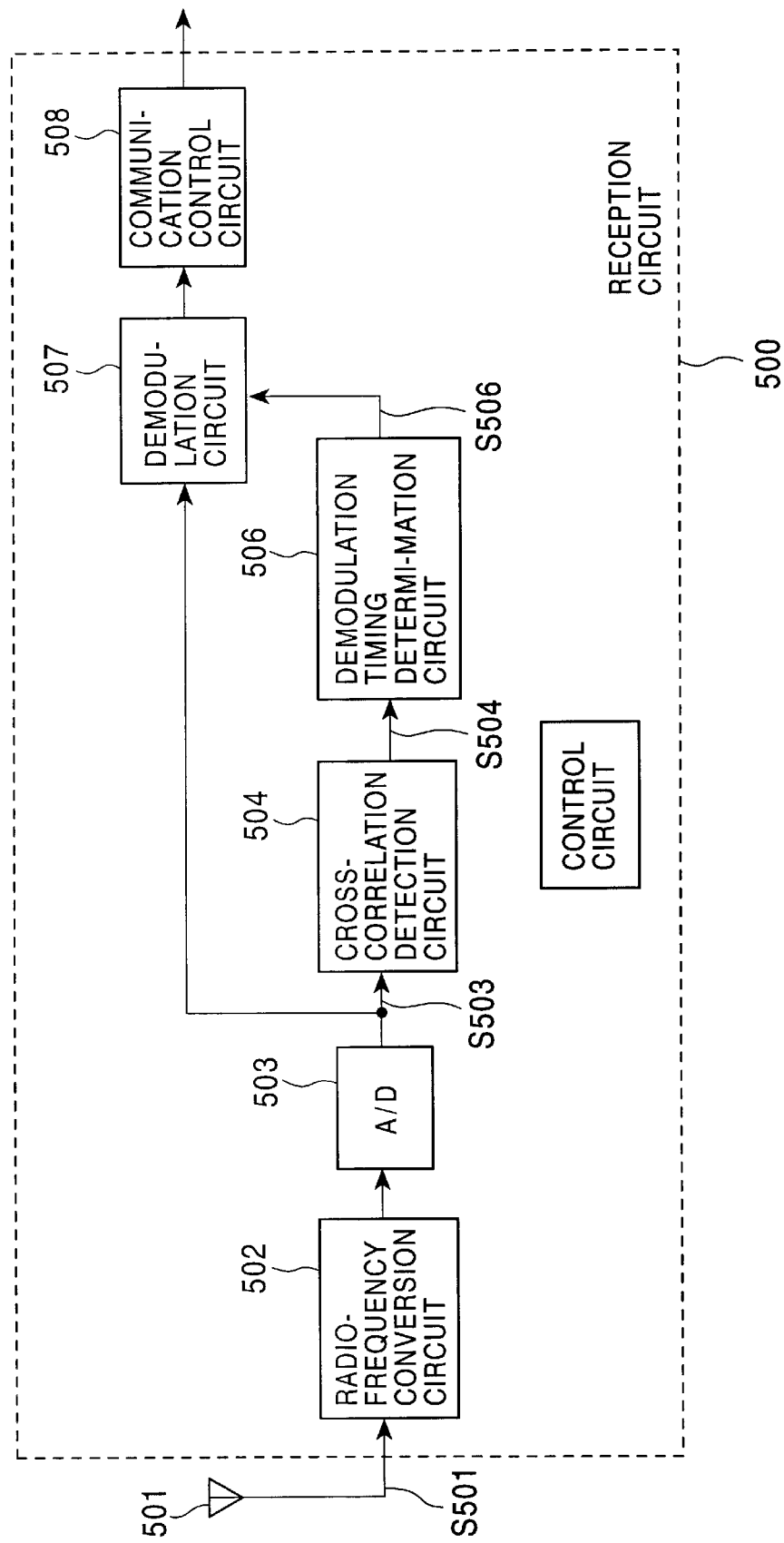
FIG. 18 shows the configuration of a reception circuit accommodated by a conventional radiocommunication system.
Figure 20A:
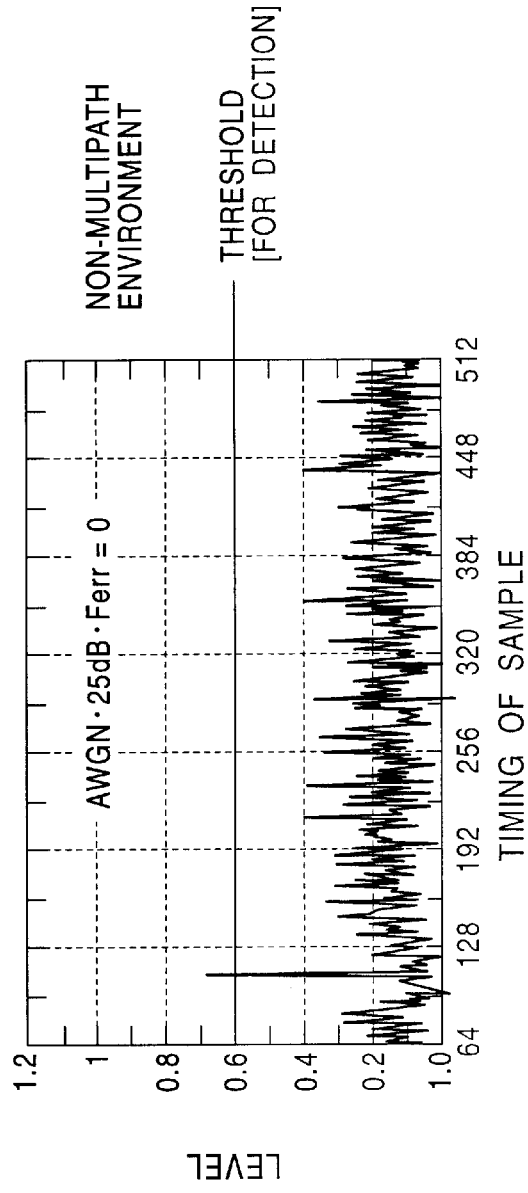
FIGS. 20A and 20B are explanatory diagrams concerning drawbacks of the reception circuit shown in FIG. 18 that are observed under a multipath environment.
Figure 20B:
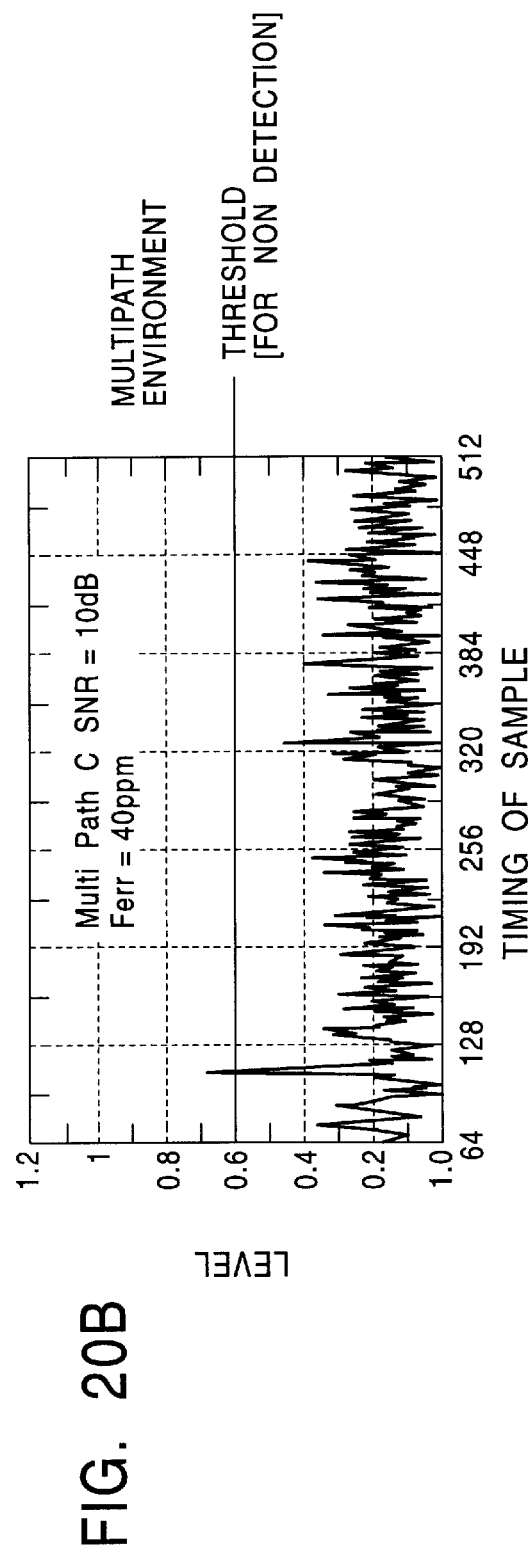

FIG. 17 shows the configuration of a radiocommunication apparatus 301 accommodated by a radiocommunication system in accordance with the fifth embodiment.

In FIG. 17, components bearing the same reference numerals as those shown in FIG. 2 are identical to the components described in relation to the first embodiment.

The radiocommunication apparatus 301 in accordance with the present embodiment includes a transmission circuit 309 that is different from the transmission circuit 9 shown in FIG. 2.

As shown in FIG. 17, the transmission circuit 309 consists of the DQPSK modulation circuit 12, a synchronism attainment signal production circuit 306, and an OFDM modulation circuit 313.

The DQPSK modulation circuit 12 is identical to the one employed in the first embodiment.

The transmission circuit 309 is characterized in that the OFDM modulation circuit 313 mixes synchronism attainment signals S306a and S306b output from the synchronism attainment signal production circuit 306 in the transmission signal.

Actions to be performed in the transmission circuit 309 will be described below.

A transmission signal S103a sent from the data terminal 103a shown in FIG. 1 is fed to the communication control circuit 11 included in the radiocommunication apparatus 301 shown in FIG. 17.

The communication control circuit 11 superimposes a signal representing a CRC code word for use in detecting an error on the transmission signal S103a to produce a transmission signal S11a. The transmission signal S11a is fed to the DQPSK modulation circuit 12.

The DQPSK modulation circuit 12 modulates the transmission signal S11a according to the DQPSK method to produce a transmission signal S12. The transmission signal S12 is fed to the OFDM modulation circuit 313.

The synchronism attainment signal production circuit 206 produces the synchronism attainment signals S306a and S306b representing the same pattern of bits. The synchronism attainment signals S306a and S306b are successively fed to the OFDM modulation circuit 313.

The OFDM modulation circuit 313 mixes the synchronism attainment signals S306a and S306b in a component of the transmission signal output from the P/S conversion circuit 34 shown in FIG. 3 which represent a real part or imaginary part. Consequently, a transmission signal S313 is produced and fed to the D/A conversion circuit 16.

The D/A conversion circuit 16 converts the transmission signal S313 from a digital form into an analog form to produce an analog transmission signal S16. The transmission signal S16 is selected by the selection circuit 17 and fed to the radio-frequency conversion circuit 18.

The radio-frequency conversion circuit 18 converts the frequency of the transmission signal S16 into a radio frequency to produce a signal S18b. The transmission signal S18b is transmitted to the antenna 26b of the radiocommunication apparatus 101b shown in FIG. 1 through the antenna 26a.

Even the radiocommunication system in accordance with the present embodiment can provide the same advantages as the radiocommunication system 100 in accordance with the first embodiment.

The present invention is not limited to the aforesaid embodiments.

For example, although the aforesaid embodiments adopt the DQPSK method as a modulation method, the present invention is not limited to any particular modulation method. The QAM method will also do.

As described so far, according to the present invention, there is provided a radiocommunication apparatus, a radiocommunication system, and a radiocommunication method in which a receiving side can reliably detect synchronism attainment signals.

According to the present invention, there is provided a radiocommunication apparatus, a radiocommunication system, and a radiocommunication method in which a receiving side can highly precisely demodulate a reception signal on a stable basis.

What is claimed is:

1. A radiocommunication apparatus for attaining the synchronism of a reception signal, which contains a plurality of synchronism attainment signals representing the same pattern of bits, relative to a reference signal, said radiocommunication apparatus comprising:

an autocorrelation detection circuit for detecting the autocorrelation function of the reception signal;

a cross-correlation detection circuit connected in parallel with the autocorrelation detection circuit for detecting the cross-correlation function of the reception signal simultaneously with the detecting of the autocorrelation detection circuit; and a synchronism attainment circuit for detecting the synchronism attainment signals contained in the reception signal based on the detected autocorrelation function from the autocorrelation detection circuit and on the detected cross-correlation function from the cross-correlation detection circuit, and thus attaining the synchronism.

2. A radiocommunication apparatus according to claim 1, further comprising a demodulation circuit for demodulating the reception signal with the synchronism attained by said synchronism attainment circuit maintained.

3. A radiocommunication apparatus for attaining the synchronism of a reception signal, which contains a plurality of synchronism attainment signals representing the same pattern of bits, relative to a reference signal, said radiocommunication apparatus comprising:

an autocorrelation detection circuit for detecting the autocorrelation function of the reception signal and outputting an autocorrelation signal;

a cross-correlation detection circuit for detecting the cross-correlation function of the reception signal and outputting a cross-correlation signal;

a mask circuit for masking a predetermined component of the cross-correlation signal according to the autocorrelation signal; and a synchronism attainment circuit for detecting the synchronism attainment signals contained in the reception signal according to the masked cross-correlation signal, and thus attaining the synchronism.

4. A radiocommunication apparatus according to claim 3, wherein said synchronism attainment circuit compares the masked cross-correlation signal with a predetermined threshold to detect the synchronism attainment signals.

5. A radiocommunication apparatus according to claim 3, wherein said synchronism attainment circuit specifies a maximum level exhibited by the masked cross-correlation signal to detect the synchronism attainment signals.

6. A radiocommunication apparatus according to claim 3, wherein said synchronism attainment circuit judges whether the masked cross-correlation signal has exceeded a predetermined threshold, specifies a maximum level exhibited by the cross-correlation signal from among all the levels exhibited thereby and exceeding the threshold, and thus detects the synchronism attainment signals.

7. A radiocommunication apparatus according to claim 3, wherein said synchronism attainment signals represent data encoded according to a pseudo spreading code.

8. A radiocommunication apparatus according to claim 3, wherein said synchronism attainment signals are signals modulated in conformity with the OFDM method.

9. A radiocommunication apparatus according to claim 3, further comprising an error correction circuit for when the reception signal contains a signal representing an error correcting code to be used to check at least part of data represented by the reception signal, corrects an error in the part of the data using the error correcting code.

10. A radiocommunication apparatus according to claim 3, wherein said plurality of synchronism attainment signals are contained in the reception signal in units of one transmission period.

11. A radiocommunication apparatus according to claim 3, further comprising a demodulation circuit for demodulating the reception signal with the synchronism attained by said synchronism attainment circuit maintained as a reference.

12. A radiocommunication system comprising:

a transmitting apparatus, said transmitting apparatus including:

a signal production circuit for producing a signal that contains a plurality of synchronism attainment signals representing the same pattern of bits, and transmitting means for transmitting the produced signal;

receiving means for receiving the signal transmitted from said transmitting means;

an autocorrelation detection circuit for detecting the autocorrelation function of the received signal;

a cross-correlation detection circuit connected in parallel with the autocorrelation detection circuit for detecting the cross-correlation function of the received signal simultaneously with the detecting of the autocorrelation function by the autocorrelation detection circuit; and a synchronism attainment circuit for detecting the synchronism attainment signals contained in the received signal based on the detected autocorrelation function from the autocorrelation detection circuit and on the detected cross-correlation function from the cross-correlation detection circuit, and thus attaining the synchronism of the received signal relative to a reference signal.

13. A radiocommunication system according to claim 12, wherein said signal production circuit included in said transmitting apparatus produces a modulated signal that contains a plurality of successive synchronism attainment signals representing the same pattern of bits.

14. A radiocommunication method for attaining the synchronism of a reception signal, which contains a plurality of synchronism attainment signals representing the same pattern of bits, relative to a reference signal, said radiocommunication method comprising the steps of:

detecting the autocorrelation function of the reception signal;

detecting the cross-correlation function of the reception signal simultaneously with the step of detecting the autocorrelation function; and detecting the synchronism attainment signals,contained in the reception signal based on the detected autocorrelation function detected in said step of detecting the autocorrelation function and based on the detected cross-correlation function detected in the step of detecting the cross-correlation function, and thus attaining the synchronism.

15. A radiocommunication method according to claim 14, further comprising a step of demodulating the reception signal with the attained synchronism maintained as a reference.

16. A radiocommunication method for attaining the synchronism of a reception signal, which contains a plurality of synchronism attainment signals representing the same pattern of bits, relative to a reference signal, said radiocommunication method comprising the steps of:

detecting the autocorrelation function of the reception signal and outputting an autocorrelation signal;

detecting the cross-correlation function of the reception signal and outputting a cross-correlation signal;

masking a predetermined component of the cross-correlation signal, which represents the cross-correlation functions of samples of the reception signal including the cross-correlation functions of the synchronism attainment signals, according to the autocorrelation signal; and detecting the synchronism attainment signals contained in the reception signal according to the masked cross-correlation signal, and thus attaining the synchronism.

17. A radiocommunication method according to claim 16, wherein the synchronism attainment signals are detected by comparing the masked cross-correlation signal with a predetermined threshold.

18. A radiocommunication method according to claim 16, wherein the synchronism attainment signals are detected by specifying a maximum level exhibited by the masked cross-correlation signal.

19. A radiocommunication method according to claim 16, wherein the synchronism attainment signals are detected by judging whether the masked cross-correlation signal has exceeded a predetermined threshold, and specifying a maximum level exhibited by the cross-correlation signal from among all the levels exhibited thereby and exceeding the threshold.

20. A radiocommunication method according to claim 16, further comprising a step of demodulating the reception signal with the attained synchronism maintained as a reference.

* * * * *